(12) United States Patent
Kawauchi et al.

(10) Patent No.: US 9,915,921 B2
(45) Date of Patent: Mar. 13, 2018

(54) ILLUMINATION DEVICE AND IMAGE RECORDING MEDIUM

(71) Applicant: Artience Lab Inc., Chiba (JP)

(72) Inventors: Hideo Kawauchi, Tokyo (JP); Akira Shirakura, Chiba (JP)

(73) Assignee: ARTIENCE LAB INC., Chiba (JP)

( * ) Notice: Subject to any disclaimer, the term of this patent is extended or adjusted under 35 U.S.C. 154(b) by 216 days.

(21) Appl. No.: 14/416,613

(22) PCT Filed: Aug. 12, 2013

(86) PCT No.: PCT/JP2013/071827
§ 371 (c)(1),
(2) Date: Jan. 22, 2015

(87) PCT Pub. No.: WO2014/027644
PCT Pub. Date: Feb. 20, 2014

(65) Prior Publication Data
US 2015/0205261 A1    Jul. 23, 2015

(30) Foreign Application Priority Data

Aug. 17, 2012  (JP) ................................. 2012-180691
Jan. 4, 2013  (JP) ................................. 2013-000249

(51) Int. Cl.
G03H 1/00 (2006.01)
G03H 1/22 (2006.01)
G03H 1/26 (2006.01)

(52) U.S. Cl.
CPC ......... G03H 1/2286 (2013.01); G03H 1/2202 (2013.01); G03H 1/265 (2013.01);
(Continued)

(58) Field of Classification Search
CPC ... G03H 2001/0083; G03H 2001/0216; G03H 2001/2213; G03H 2223/14; G03H 2227/02; G03H 2227/06
See application file for complete search history.

(56) References Cited

U.S. PATENT DOCUMENTS 6,018,403 A * 1/2000 Shirakura ............ G03H 1/0408
359/23
6,115,151 A * 9/2000 Popovich ............. G03H 1/0256
349/201
(Continued)

FOREIGN PATENT DOCUMENTS

JP         6-55973        3/1994
JP    1998-063210 A       3/1998
(Continued)

Primary Examiner — Kimberly N Kakalec
(74) Attorney, Agent, or Firm — Ming Chow; Sinorica, LLC

(57) ABSTRACT

[Problem] A penlight used for decoration or as a flashlight for the purpose of illuminating the surroundings lacks functionality for optimal enjoyment of a hologram, and no conventional illumination device for a hologram has decorative effect. [Solution] The present invention has a hologram support unit, a light source, and a light diffuser, and by primarily irradiating the light diffuser from the light source, decorative effect is increased, and primarily a hologram image region can be illuminated from a predetermined angle from the same light source or a different light source. Appropriate observation is made possible by making note to an observer on a portion of a medium material integrated with a hologram material whether to irradiate illuminating light from above or irradiate illuminating light from below.

31 Claims, 36 Drawing Sheets

(52) U.S. Cl.
CPC ..... *G03H 1/268* (2013.01); *G03H 2001/0055* (2013.01); *G03H 2222/34* (2013.01); *G03H 2227/03* (2013.01); *G03H 2227/06* (2013.01)

(56) References Cited

U.S. PATENT DOCUMENTS

| | | | |
|---|---|---|---|
| 6,323,971 B1* | 11/2001 | Klug | G03H 1/22 352/86 |
| 6,674,556 B1* | 1/2004 | Mori | G03H 1/22 359/15 |
| 2003/0123150 A1* | 7/2003 | Brickey | G02B 5/0242 359/599 |
| 2003/0184831 A1* | 10/2003 | Lieberman | G03H 1/22 359/32 |
| 2007/0216980 A1* | 9/2007 | Shirakura | G03H 1/22 359/15 |
| 2008/0090063 A1* | 4/2008 | Inokuma | C03C 17/3405 428/220 |
| 2010/0027289 A1* | 2/2010 | Aiki | G02B 6/0011 362/558 |
| 2012/0044571 A1* | 2/2012 | Mukawa | G02B 27/0103 359/630 |
| 2012/0119978 A1* | 5/2012 | Border | G02B 27/0172 345/8 |

FOREIGN PATENT DOCUMENTS

| | | |
|---|---|---|
| JP | H1999-344918 A | 12/1999 |
| JP | 2000-137428 A | 5/2000 |
| JP | P2000-194794 A | 7/2000 |
| JP | 2001-142382 A | 5/2001 |
| JP | 2007-249114 A | 9/2007 |
| JP | 2008-70478 A | 3/2008 |

\* cited by examiner

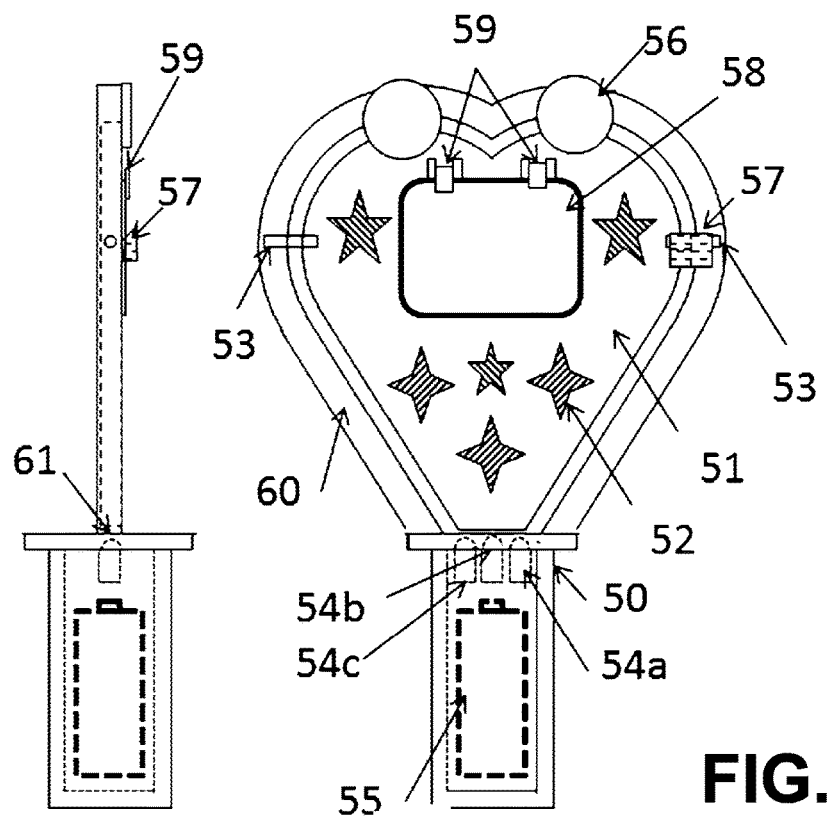
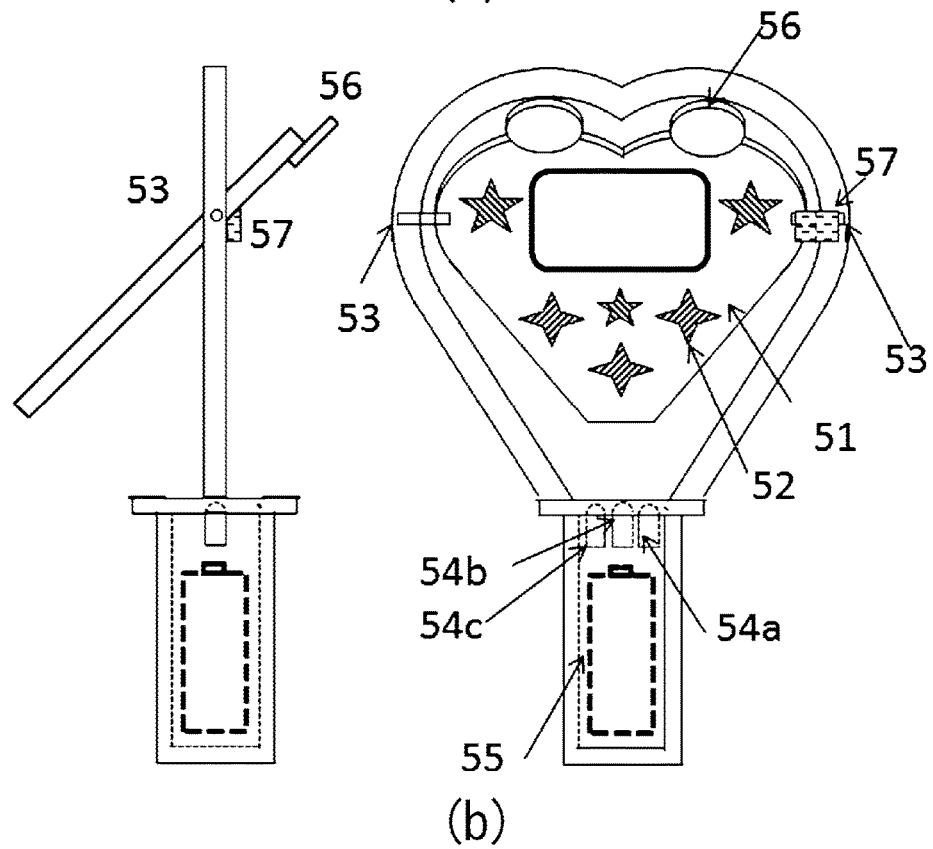
FIG. 5

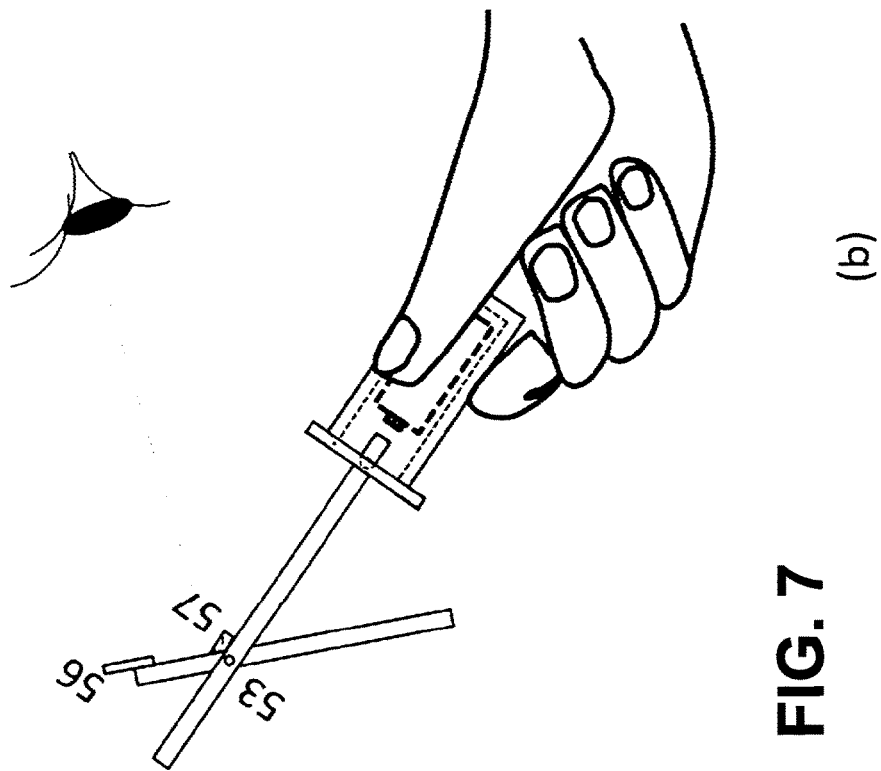
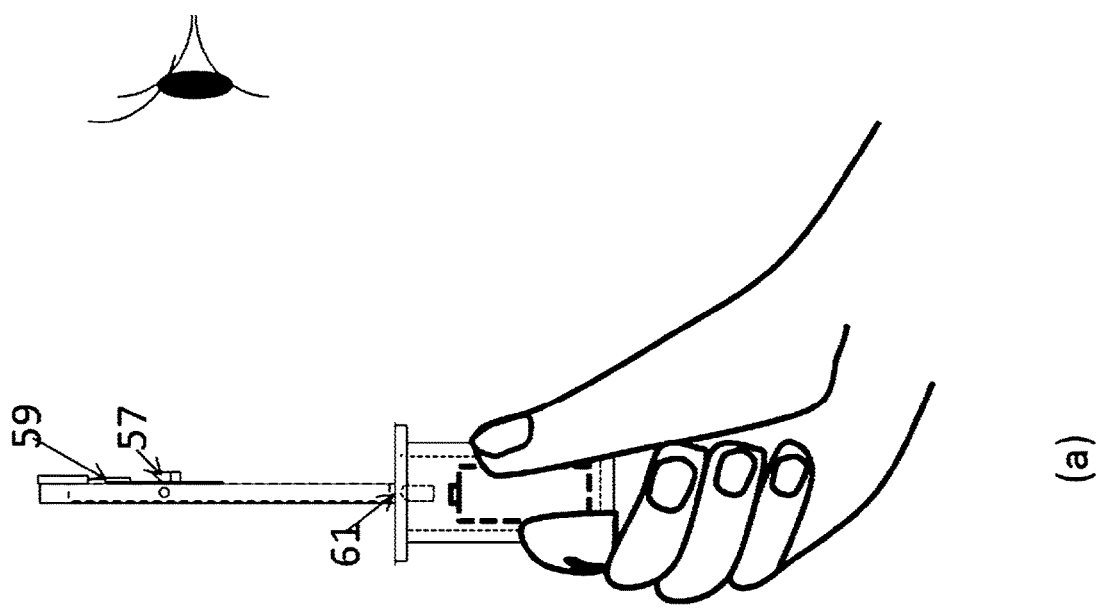
FIG. 7

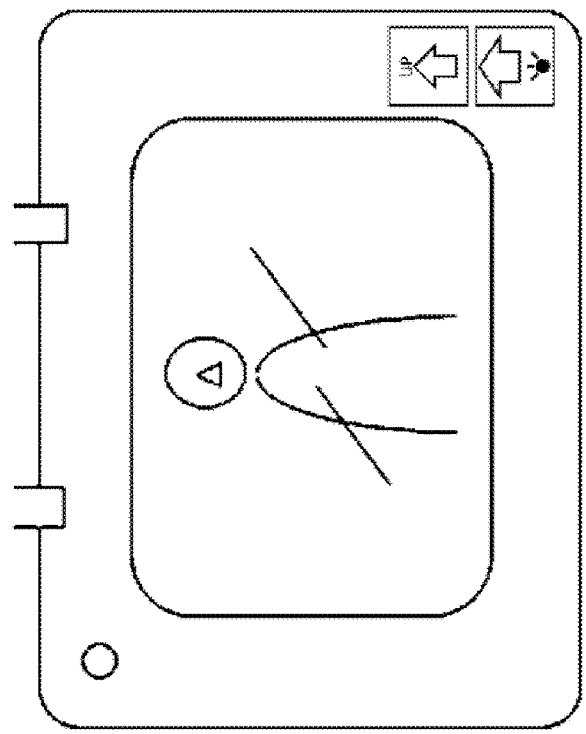
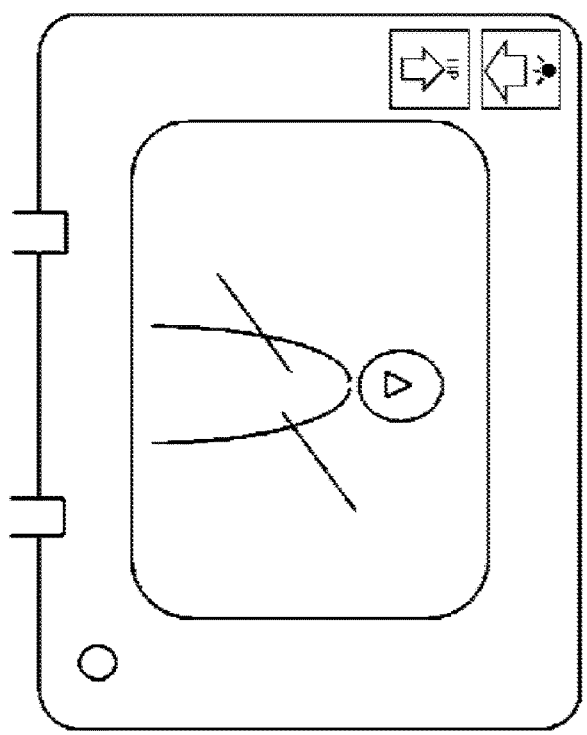
FIG. 10

FIG. 13
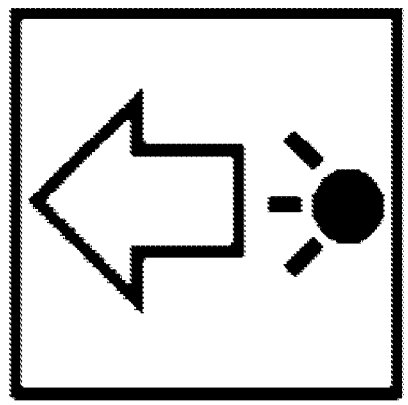
(b)
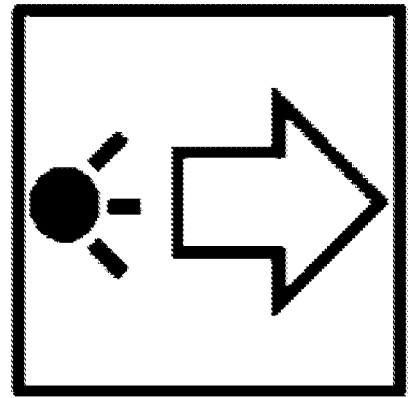
(a)

FIG. 16
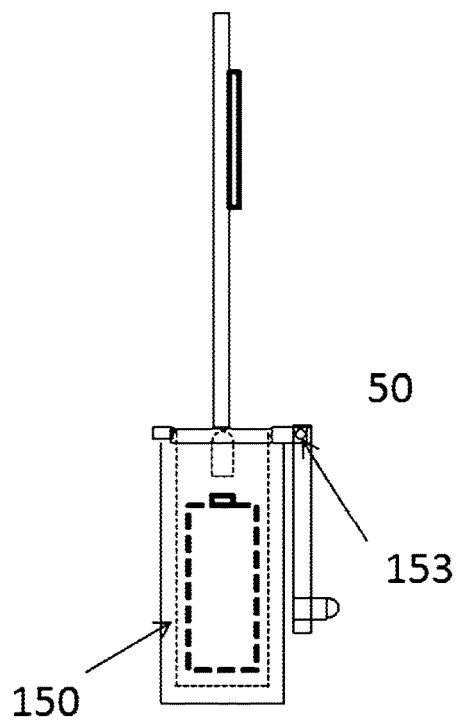
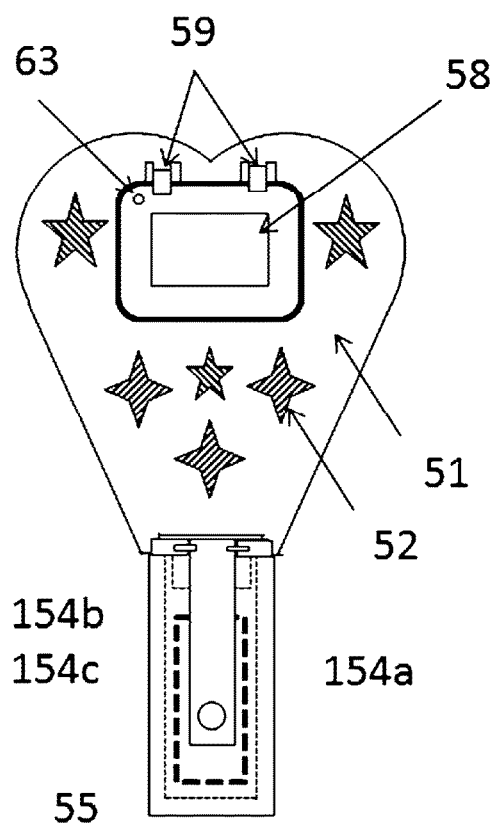
(a)
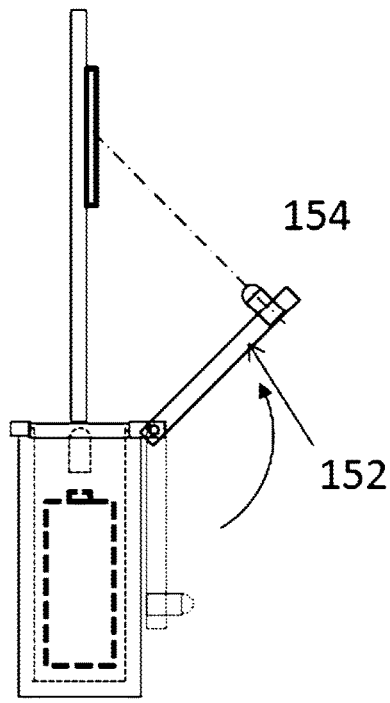
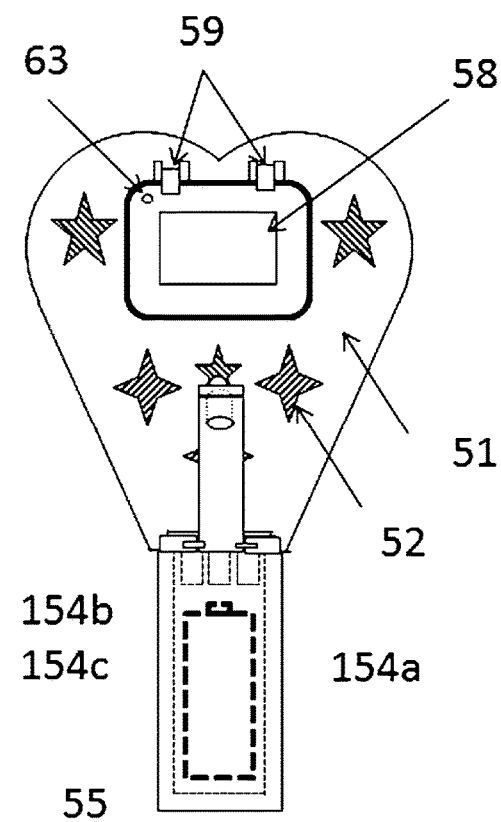
(b)

FIG. 17
(a) 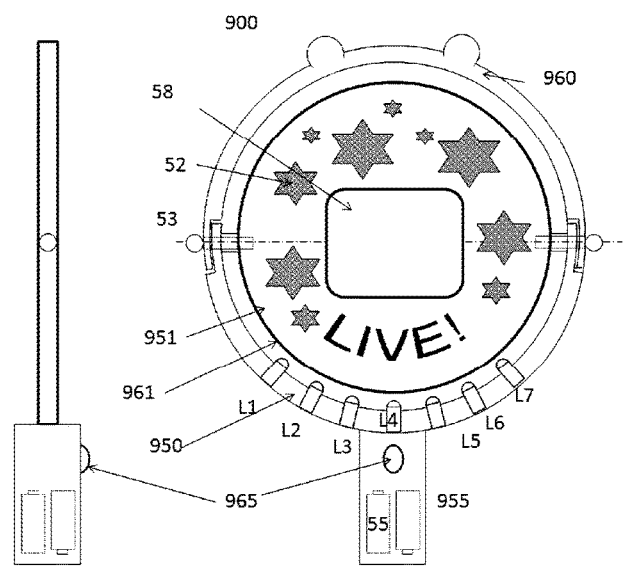
(b) 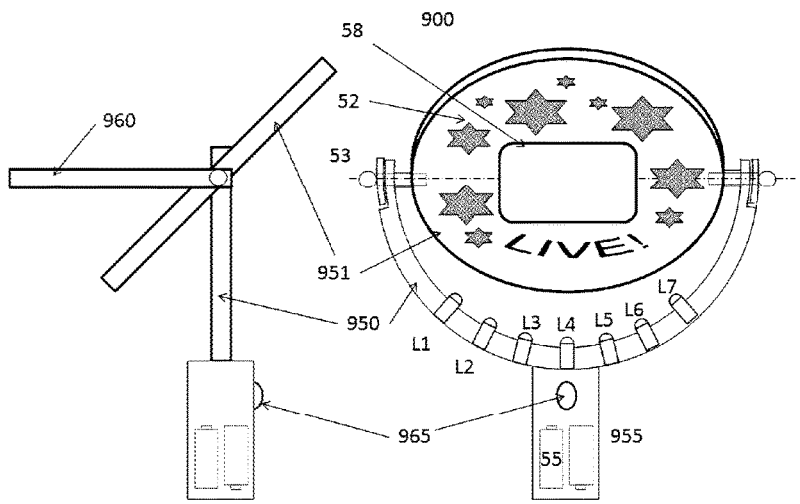
(c) 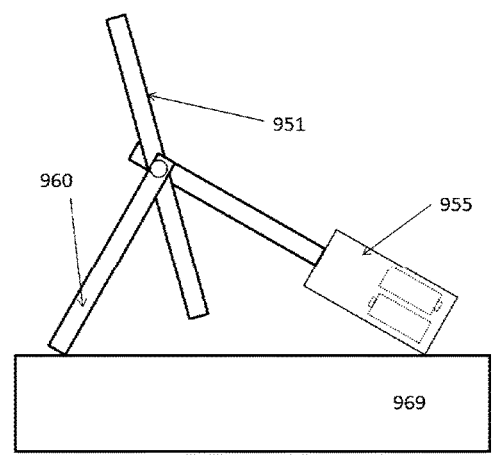

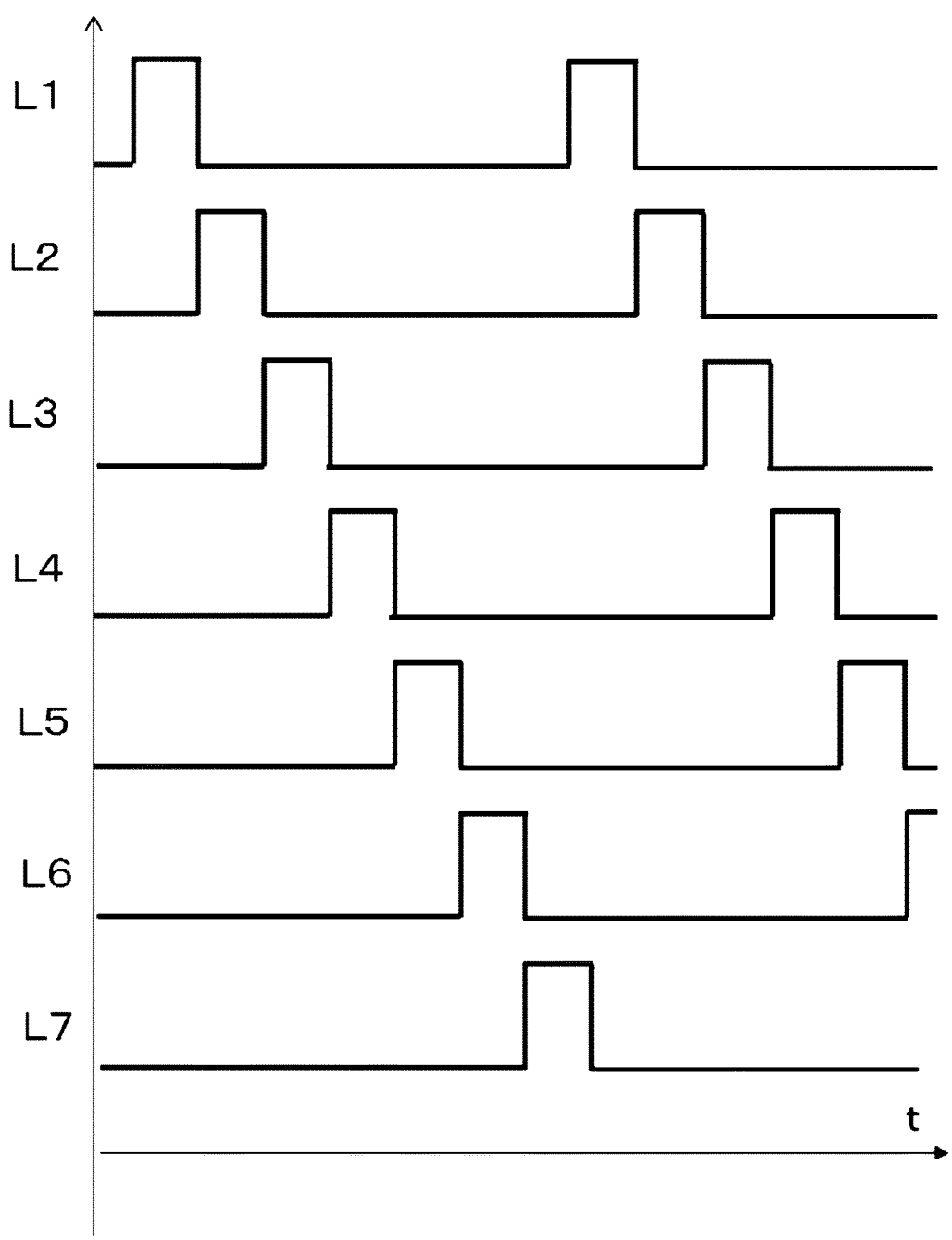

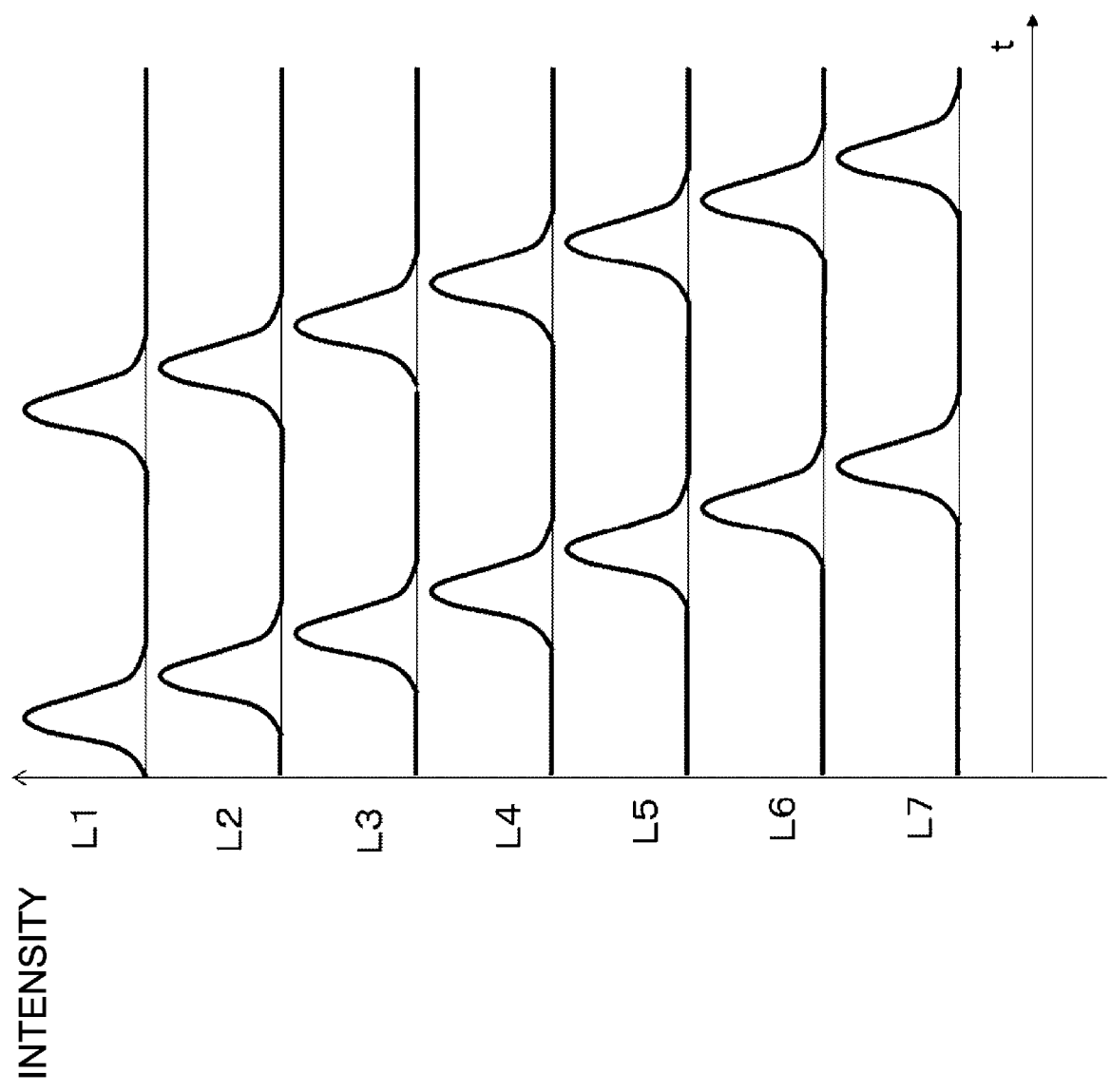

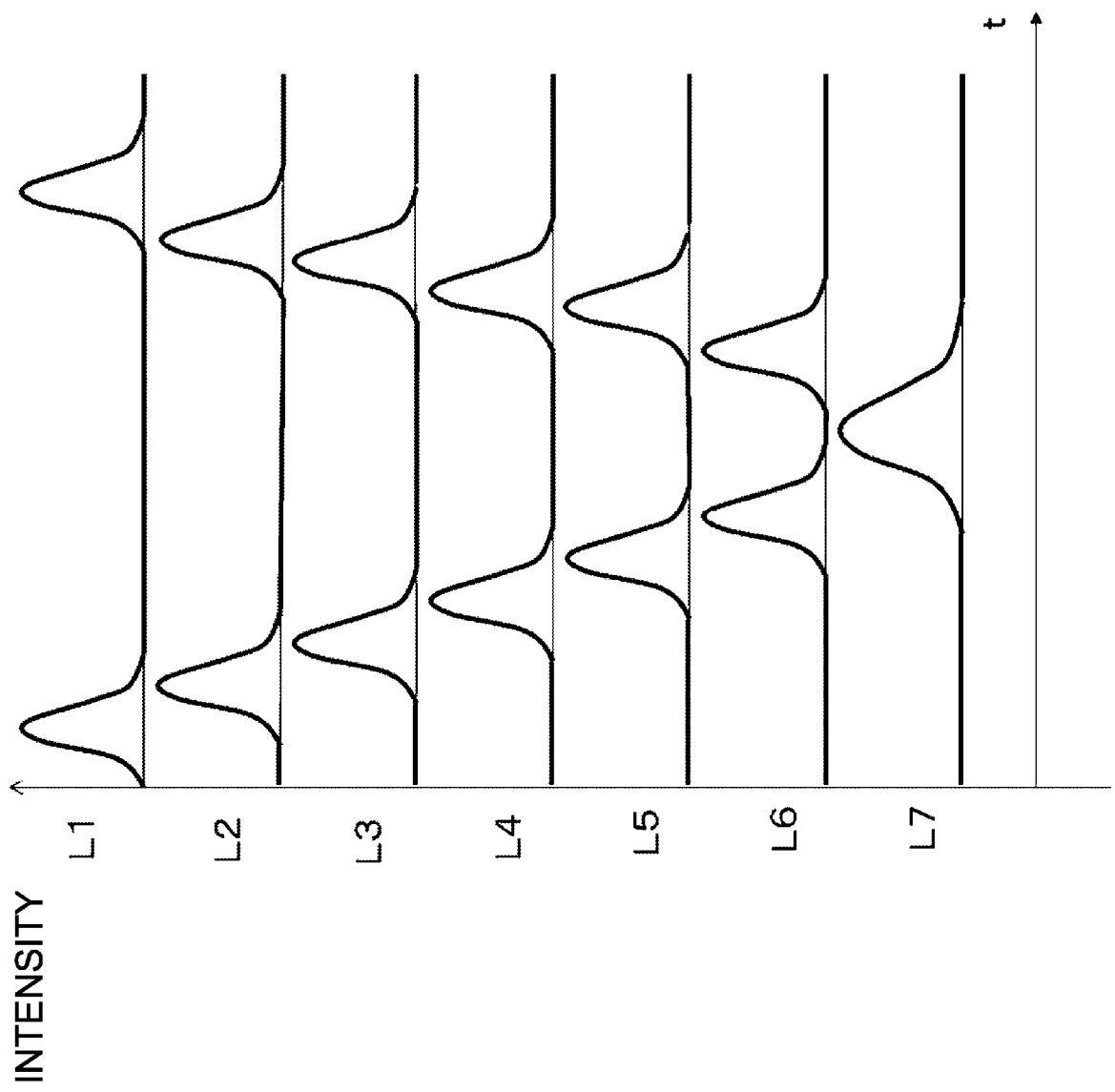

ILLUMINATION DEVICE AND IMAGE RECORDING MEDIUM

The current application is the PCT/JP2013/071827, filed on Aug. 12, 2013, entering U.S. National Stage application. The PCT/JP2013/071827 claims priorities to Japan patent application No. 2013-000249 filed on Jan. 4, 2013, and Japan patent application No. 2012-180691 filed on Aug. 17, 2012.

BACKGROUND OF THE INVENTION

The present invention relates to an illuminating device and a medium to be illuminated that are a penlight/flashlight for lighting in a dark place and for presenting dramatic effects, with a functionality for effective viewing of a hologram or a holographic stereogram.

Reproduction of a three-dimensional image (holographic image) is made possible with a hologram by its illumination by a reproducing light. Whereas in some cases coherent light such as laser light is required, in the case of the reproduction of a hologram such as a rainbow hologram or a Lippmann hologram incoherent white light such as a halogen lamp or natural light can be used.

Such holograms that allow the use of white light sources as the reproducing light have been widely utilized for purposes such as prevention of forgery of credit cards. Various holographic display devices are also being utilized as devices such as for displaying holographic images for viewing enjoyment.

When a hologram is illuminated by reproducing light, the optical wavefronts of the light from the recorded object during the recording are reproduced, and these wavefronts are viewed as a holographic image by the viewer. What is referred to as the holographic stereogram is another kind of hologram. A holographic stereogram is produced, using as the original images a large number of images obtained by capturing images of the subject sequentially from different viewpoints, by recording on a single sheet of hologram recording medium consecutive exposures of element holograms in the form of strips or dots.

For example, a holographic stereogram that has parallax information only in the horizontal direction is produced by sequentially displaying on the display of a holographic stereogram printing system incorporating a prescribed optical system a plurality of original images that are obtained by sequential image capture of the subject 100 from different horizontal viewpoints and illuminating the displayed images with laser light to execute consecutive exposures to record on a hologram recording medium, as element holograms, the interference fringes generated by interference between the object light, which is modulated as an image, and the reference light.

Because the image information obtained by successive capture of images from different horizontal viewpoints are consecutively recorded in the horizontal direction as strips of element holograms, the collection of image information recorded as a certain part of each element hologram is perceived as a two-dimensional image when seen by the viewer with one eye from a particular position, and the collection of image information recorded as a different part of each element hologram is perceived as a different two-dimensional image when seen by one eye from a different position. Therefore, when the viewer sees a holographic stereogram with both eyes the exposed image record is perceived as a three-dimensional image due to the parallax between the left and right eyes.

In order to improve the legibility of the holographic image with satisfactory reproduction of holograms such as the holographic stereogram described in the preceding paragraphs, the angle of divergence of the illuminating light from the light source that is used as the reproducing light must resemble that of the reference light upon recording the hologram, or it must be parallel light. Therefore, in the reproduction of a hologram the legibility and image quality of the holographic image that is viewed depends on the spatial relationship of the positions of the hologram, the light source and the viewer, as well as on their physical forms.

Therefore, especially in displaying a hologram for the purpose of viewing enjoyment, it is necessary to enable satisfactory reproduction of the holographic image by constraining the relative positions of the hologram, light source and viewer.

As described in Patent Document 1 in the following list, for example, various devices for display of holograms have been proposed that comprise a hologram and a light source for illuminating the hologram with reproducing light.
Patent Document 1
Patent Document 2 (Pen-type viewer)
Patent Document 3 (Holographic wrapping)

There are also various proposals of penlights for use in such events as concerts.
Patent Document 4 (Multi-color penlight)

There are also various proposals of flashlight functionalities that can be used in such scenes as disasters.

These previous holographic display devices required much effort to transport and carry because of their large sizes. The conventional holographic display device described in Patent Document 1 is made to be a construction with great volume and weight due to the complexity and elaborateness of the light source for illuminating the hologram with reproducing light and of the optical system for the improvement of the legibility of the holographic image by constraining the relative positions of the hologram, the light source and the viewer.

Although the portability of the pen-type viewer described in Patent Document 2 is good, it is strictly a device used for the purpose of illuminating a hologram, and has the disadvantage of the extensive handling that is required in setting up for viewing.

Further, the hologram wrapper described in Patent Document 3 is also strictly a device used for the purpose of illuminating a hologram. Although it enables both the holding of the hologram and the light source in optimal relative positions upon viewing and the elimination of the risk of breakage and damage to the surface of the hologram during transportation and carriage, it can hardly be used to function for other purposes such as lighting a dark place or enhancing decorativeness. Other proposals have also been made to illuminate a hologram from a predetermined angle in addition to improving the portability, but none of these provided any decorative effect, to the hologram or when the hologram is not being viewed, through the combination of the light source and an optical diffuser element.

Further, although many types of penlight have been proposed for use in such events as concerts, such as a multicolor penlight of a type described in Patent Document 4 and flashlights and compact penlights for the purpose of use in disasters and in searching for a keyhole in a dark place, they are difficult to use unless the user is trained because of the required understanding of fundamental knowledge about the direction from which the light source must illuminate the hologram.

Therefore, the purpose of this invention is to provide the functionality of holographic viewing, capable of reproducing a good holographic image, to an article that is highly portable and that can be used in the fashion of a flashlight or a penlight or as a decorative light that gives a dramatic presentation effect on people.

In order to realize a solution to the issues described in the preceding paragraphs, this invention provides an illuminating device with the features of comprising a unit for holding a hologram or a holographic stereogram, a light source, a battery and an optical diffuser, of having a member acting as an optical diffuser of the light from the light source, and of providing the capability to attach such hologram or holographic stereogram in a condition such that no member other than those which are optically nearly transparent is placed within the optical path from the light source to the image region of such hologram or holographic stereogram or within the zone of directions from at least 20 degrees above to 20 degrees below, and from 45 degrees to the left to 45 degrees to the right, with respect to the normal to the center of the area of the hologram on the side of the viewer.

In an example of a preferred embodiment, there is a mechanism to switch between a first configuration in which the light from the light source is led into the light-guiding diffuser and a second configuration in which it is made to illuminate such a hologram support unit from a predetermined angle, by joining the carrier for the light source and the light-guiding diffuser, both described in the preceding paragraphs, by means of a movable element.

This invention enables both the functionalities of use as a flashlight or penlight in disasters and emergencies and of use for decorative/dramatic presentation effects in concerts and events, as well as ready placement and maintenance of the relative positions of the hologram and light source in an optimal relationship.

In addition, it enables, by simultaneous or sequential illumination of the optical diffuser element that is placed in the illuminating device, the expression of decorativeness that was not possible by the hologram alone.

BRIEF DESCRIPTION OF THE DRAWINGS

FIG. 5 is a set of schematic diagrams illustrating exemplary configurations of the first embodiment, in use as a penlight and for viewing a hologram;

FIGS. 7A and 7B each is a schematic diagram illustrating the second embodiment in the case of holding the illuminating device (A) in the configuration of use as a penlight, and (B) in the configuration for viewing a hologram;

FIG. 10 is a schematic diagram illustrating the orientations in which the hologram medium is mounted in the first embodiment and the second embodiment;

FIG. 13 is a schematic diagram illustrating exemplary markings indicating the direction from which the illuminating light is incident on the hologram;

FIG. 16 is a set of schematic diagrams illustrating exemplary configurations of the third embodiment, in use as a penlight and for viewing a hologram;

FIG. 17 is a schematic diagram illustrating the fourth embodiment in the configuration of use as a penlight, in the configuration for viewing a hologram and in the case of viewing a hologram when set on top of a flat platform;

FIG. 18A is a schematic diagram illustrating the control of the intensities of the light sources in the fourth embodiment;

FIG. 18B is a schematic diagram illustrating the control of the intensities of the light sources in the fourth embodiment;

FIG. 18C is a schematic diagram illustrating the control of the intensities of the light sources in the fourth embodiment;

Figure 1:
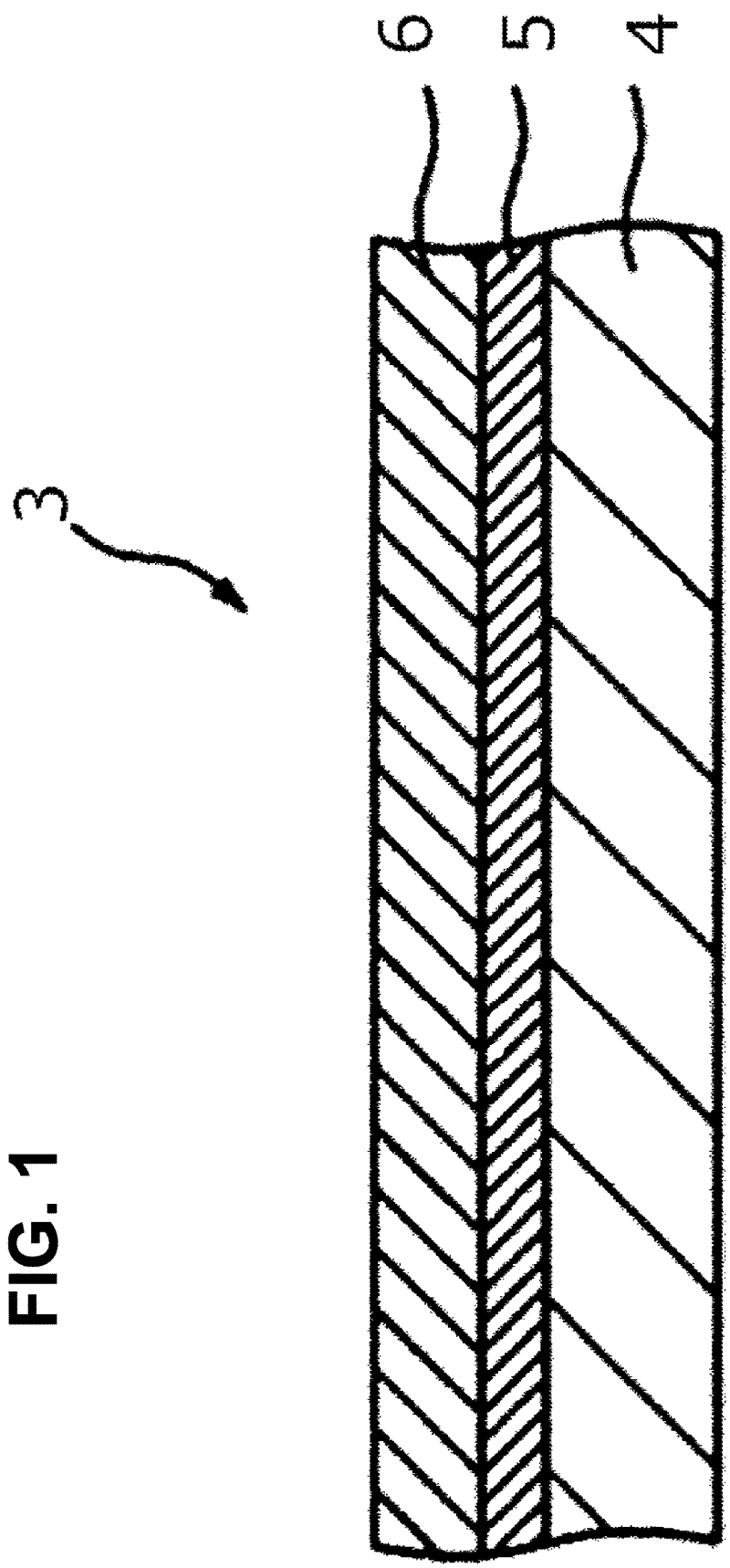
FIG. 1 is a cross-sectional diagram illustrating an exemplary hologram recording medium.

DESCRIPTION OF THE REFERENCE NUMERALS 3 hologram recording medium
4 base film
5 photopolymer layer
10 holographic stereogram printing device
500 penlight
50 carrier for light sources
51 light-guiding diffuser
52 diffusing area
53 hinge
54a, 54b, 54c light sources
55 battery
56 stopper a
57 stopper b
58 hologram
59 clips
60 bracket
61 end face for incidence of light
62 frame
63 cylindrical protrusion
64 hole for defining position
65 hole
70 hologram medium
71 hologram recording layer
72 base material layer A
73 base material layer B
74 frame A
75 frame B
76 adhesive agent
150 carrier for light source for light-guiding diffuser
152 support of light source for hologram illumination
153 hinge
154a, 154b, 154c light sources for light-guiding diffuser
154d light source for hologram illumination
200 illumination of hologram with rocking device
214 hologram
221, 222 weights
223, 224 bearings
225 foot
250 hologram illumination device
251 hologram
252 glass plate
253 clock
254 acrylic plate
255-261 LEDs
310 rocking device
314 hologram
350 penlight
355 battery
360 housing/optical diffuser
365 switch
369 handle module
370 optical diffuser
373 front of housing/transparent member
374 LED
375 prism sheet
376 reflective mirror
377 lens
378 opaque plate
380 plastic cylinder
381 diffuser sheet
390 lower pivot
391 upper pivot
392 support of holder stand
393, 394 weights
395, 396 electromagnetic coils
397 foot of holder stand
600 penlight
610 transparent hollow structure
611 decorative diffuser
612 light introducing part
613 mirror
614 hologram support unit
615 aperture in hologram holder
616 opaque member
617 hologram guides
618 stopper
619 handle module
620 optical aperture
655 battery
665 switch
700 penlight
710 housing
713 mirror
714 hologram attachment
719 handle module
720 optical aperture
721 optical diffuser
750 penlight
760 housing
764 hologram attachment
769 handle module
770 optical diffuser
771 letters
772 inner wall of optical diffuser
773 front face of housing
774 LED
800 penlight
807 hinge
808 fluid
809 transparent hollow sphere A
810 transparent hollow sphere B
811 decorative diffuser chips
812 weight
813 LED
814 hologram support unit
815 hologram
819 handle module
820 hologram with fluid hourglass
821 holding stand
822 flange
823 notch
824 guide
850 cylindrical illumination device
851 cylindrical housing
852 hologram
853 optical diffuser 854 LED for illumination of the hologram
855 LEDs for illumination of the optical diffuser
856 battery
865 switch
900 penlight
950 carrier for the light source
951 light-guiding diffuser
955 batteries
960 bracket
965 switch
969 desk
980 penlight with movable light source
981 slide rail
982 sliding unit
L1-K7 light sources
LX1, LX2 LEDs

DESCRIPTION OF THE PREFERRED EMBODIMENTS

Hereinafter, the best modes (hereinafter, referred to as "embodiments") for implementing the invention will be described. Descriptions will be given in the following order.

1. Recording of an element hologram on a hologram recording medium 2. First Embodiment 3. Second Embodiment 4. Third Embodiment 5. Fourth Embodiment 6. Fifth Embodiment 7. Sixth Embodiment 8. Seventh Embodiment 9. Eighth Embodiment 10. Ninth Embodiment 11. Tenth Embodiment 12. Eleventh Embodiment 13. Twelfth Embodiment 14. Thirteenth Embodiment 15. Fourteenth Embodiment 16. Modified Embodiments Those described below are preferred embodiments of the invention and are thus limited in terms of technical preference. The scope of the invention, however, is not limited to those embodiments unless otherwise indicated.

DESCRIPTION OF THE PREFERRED EMBODIMENTS

Hereinafter, the best modes (hereinafter, referred to as "embodiments") for implementing the invention will be described, with reference to figures. This invention is applied in attaching a hologram or a holographic stereogram to a wrapper or a display device.

Thus, before describing the wrapper or display device in which this invention is applied, the holographic stereogram is specifically described in the following paragraphs as an example of the hologram or holographic stereogram that is mounted on such wrapper or display device.

First, the principle of the exposure to record an element hologram on a hologram recording medium is described.

Figure 2:
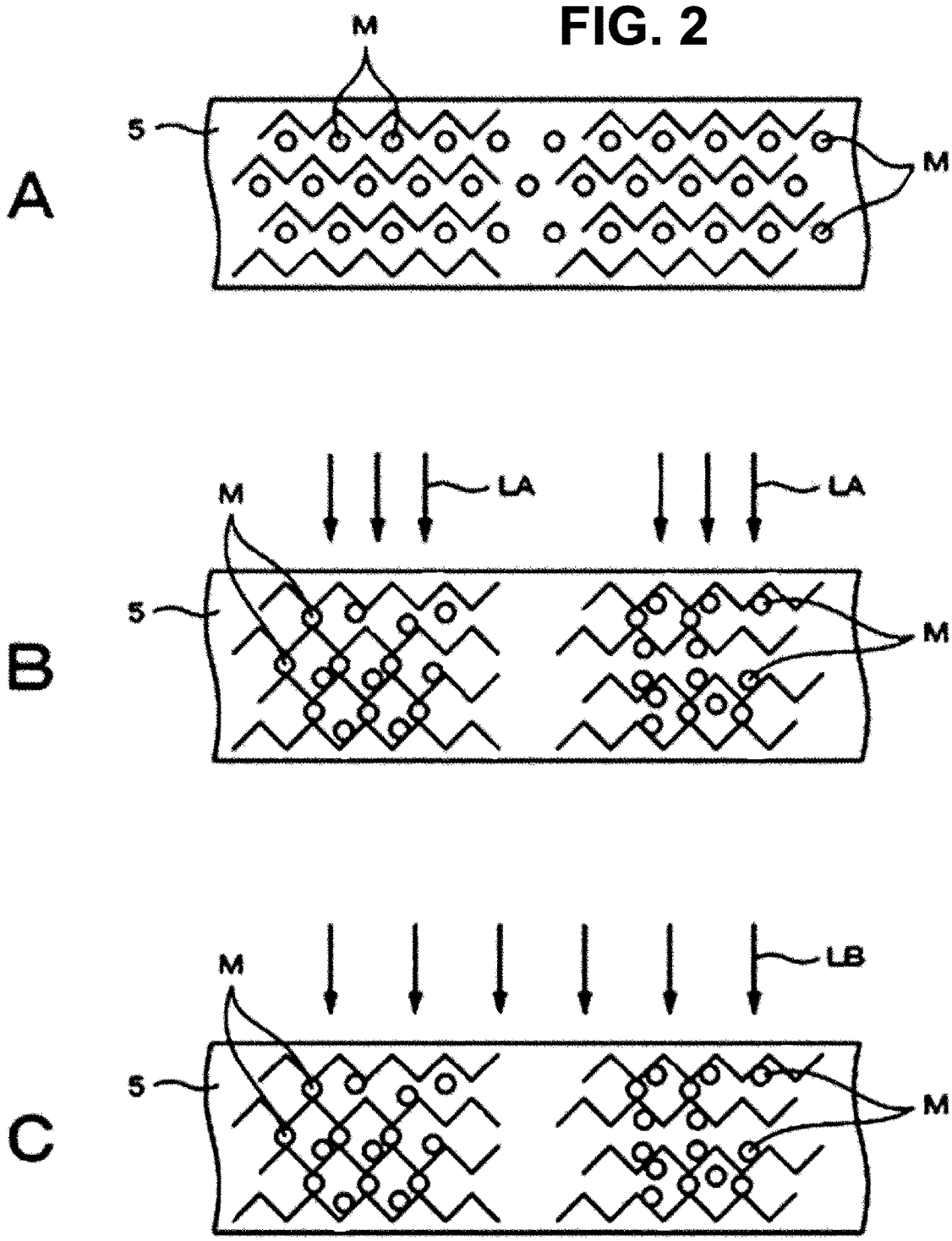
FIG. 2 is a set of schematic diagrams illustrating an exemplary photosensitive exposure process of a hologram recording material.

The holographic recording medium 3 is composed as a film-coated recording medium, as shown in FIG. 1, by forming, with a photopolymerizable photopolymer, a photopolymer layer 5 that is the recording layer on a base film 4 that is a base material of, for example, polyethylene terephthalate (hereinafter, referred to as PET) and attaching onto this photopolymer layer 5 a cover film 6 that is a base material of, for example, a PET film. In such a hologram recording material 3, as shown in FIG. 2A, the photopolymerizable photopolymer constituting the photopolymer layer 5 is in a uniformly dispersed condition in the matrix polymer. By irradiation with laser light LA with a power of 10 mJ/cm2 to 400 mJ/cm2, the photopolymerizable photopolymer in the exposed part is made to be, as shown in FIG. 2B, in a polymerized condition in which the monomers M that were uniformly dispersed in the matrix polymer have been polymerized.

As the polymerization of the photopolymerizable photopolymer proceeds, migration of the surrounding monomers M results in variations of their concentration which produces modulations of the refractive index between the exposed and unexposed parts. Then, as illustrated in FIG. 2C, polymerization of the monomers M in the matrix polymer is completed when the entire surface is irradiated with ultraviolet or visible light LB of about 1000 mJ/cm2.

In the hologram recording material 3, exposure and recording of interference fringes produced by interference between the reference light and the object light are made as variations of the refractive index by the changes produced in the refractive index of the photopolymerizable photopolymer constituting the photopolymer layer 5 according to the irradiation by laser light LA.

It is not necessary for the hologram recording medium 3 to be subject to a dedicated development process after recording by exposure since it is formed as a film-coated recording medium. Accordingly, the need for the holographic stereogram printing system to have a construction for a development process is obviated by the use of such hologram recording medium 3, which enables simplification of the configuration of the apparatus and rapid production of a holographic stereogram.

In the following, a description is given of the holographic stereogram printing system used for the production of a holographic stereogram using the hologram recording medium 3 described in the preceding paragraphs.

The following description is for the case of the production of a holographic stereogram with horizontal parallax information embedded by exposure and recording of a plurality of strips of element holograms on a single hologram recording medium 3. The holographic stereogram may of course, as an example, have parallax information in both horizontal and vertical directions embedded by exposure and recording of a plurality of element holograms in the form of dots.

Figure 3:
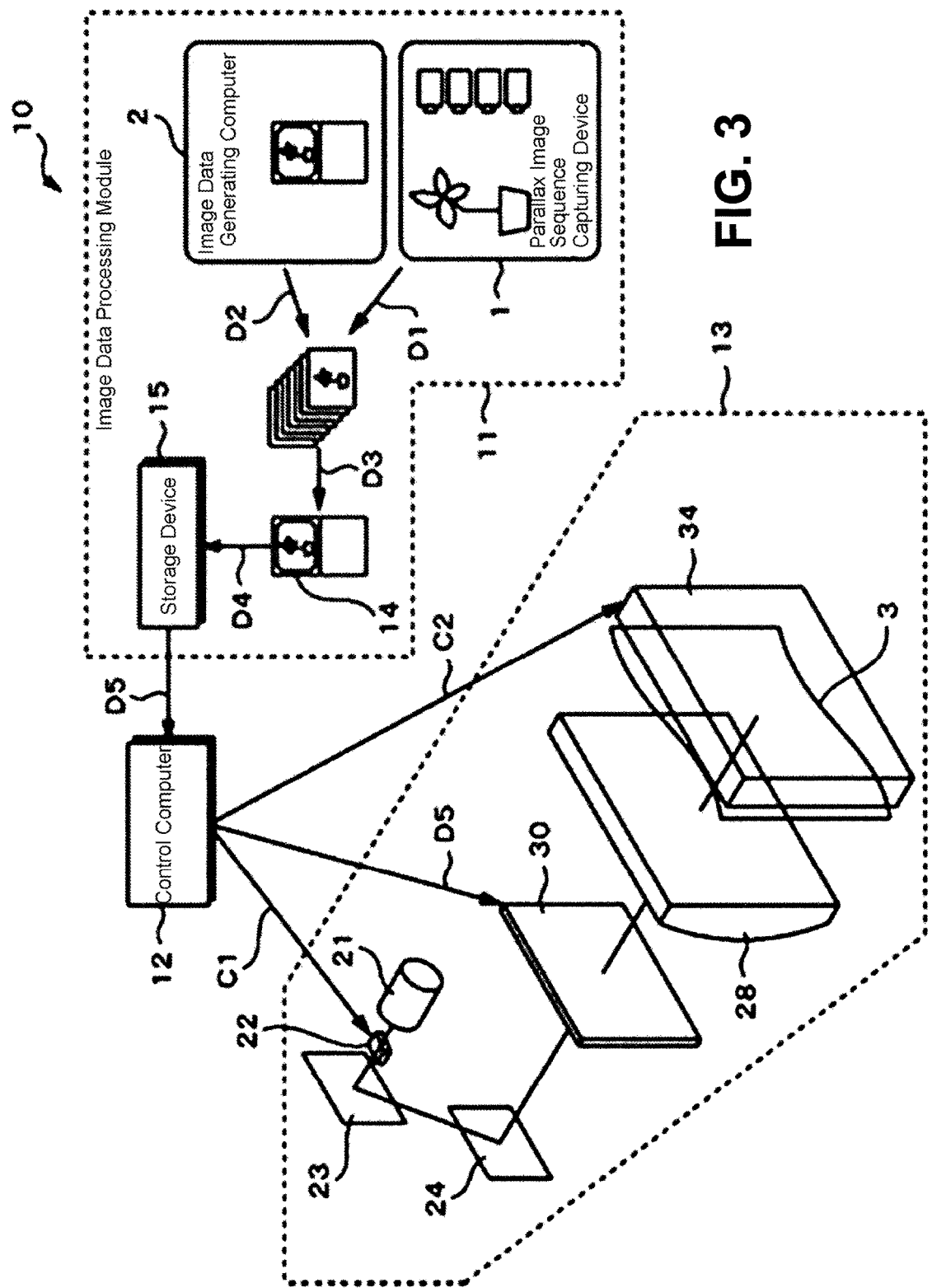
FIG. 3 is a schematic diagram illustrating the overall composition of an exemplary holographic stereogram printing device.

The holographic stereogram printing system 10, as shown in FIG. 3, exposes and records holographic stereogram images on a hologram recording medium 3 that is a photosensitive film. The holographic stereogram printing system 10 comprises an image data processing module 11 for processing the image data for exposure and recording, a control computer 12 for controlling the entire holographic stereogram printing system 10 and a holographic stereogram printing module 13 incorporating an optical system for producing a holographic stereogram.

The data processing module 11 comprises at least an image processing computer 14 and a storage device 15 and, for example, generates a parallax image data sequence D3 based on the captured image data D1 incorporating parallax information supplied from a parallax image sequence capturing device 1 by, for example, a multi-view camera or a translating camera, or on image data such as computed image data D2 that incorporate parallax information and that is generated by an image data generating computer 2. The captured image data D1 are a set of a plurality of image data acquired by, for example, simultaneous capture with a multi-view camera or sequential capture with a translating camera, and parallax information is incorporated among individual image data that constitute the captured image data D1. The computed image data D2 are a set of a plurality of image data generated, for example, as CAD (Computer Aided Design) or CG (Computer Graphics) data, and parallax information is incorporated among individual image data that constitute the computed image data D2.

The image data processing module 11 performs prescribed image processing for the holographic stereogram on the parallax image data sequence D3 with an image processing computer 14, based on these captured image data D1 and/or computed image data D2, to generate the hologram image data D4. The hologram image data D4 are temporarily stored in, for example, a storage device 15 such as a memory or hard disk. As described in the following paragraphs, in the exposure and recording of element hologram images on the hologram recording medium 3, the image data of the element holograms are read out from the stored hologram image data D4 sequentially for the data of an individual image at a time, and these element hologram image data D5 are supplied to the control computer 12.

The control computer 12 controls the holographic stereogram printing module 13 to sequentially expose and record element display images, based on the element hologram image data D5 supplied by the image data processing module, as strips of element holograms on the hologram recording medium 3 placed in a part of the holographic stereogram printing module 13. In this function, the control computer 12 controls the operation of each mechanism of the holographic stereogram printing module 13, as described in the following paragraphs.

In the structure of the holographic stereogram printing module 13, each component of the optical system is installed and supported on a supporting plate (optical table) that is not shown in the figure, and this supporting plate is supported by the main frame of the apparatus by means of such components as dampers that are not shown in the figure. The optical system of the holographic stereogram printing module 13 for holographic stereogram printing includes an incident optical system, an object optical system and a reference optical system. The holographic stereogram printing system 10 has a structure in which at least the optical system is shielded from light because of the use of the hologram recording medium 3 which is a photosensitive material.

Figure 4:
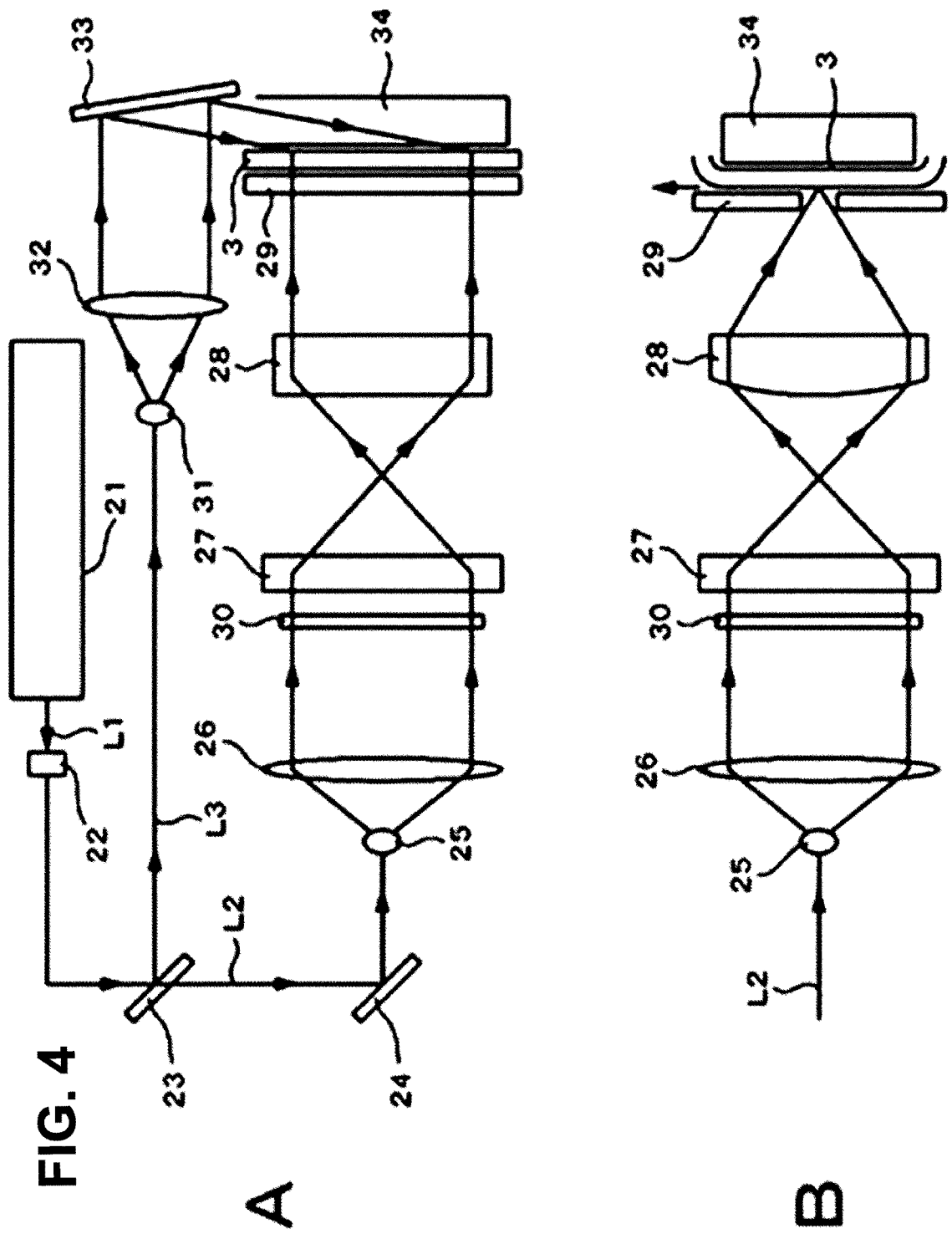
FIG. 4 is a set of schematic diagrams illustrating an exemplary optical system of a holographic stereogram printing device.

As illustrated in FIG. 4A, the holographic stereogram printing module 13 comprises an incident optical system with a laser light source 21 that emits laser light of a prescribed wavelength, a shutter mechanism 22 that is placed on the optical axis of the laser light L1 from this laser light source 21 and either passes the laser light L1 through to the next stage or blocks it, and a half mirror 23 that splits the laser light L1 into the object light L2 and the reference light L3.

The laser light source 21 is composed of a laser device that emits laser light L1 of a single wavelength with good coherence, such as a semiconductor-laser pumped YAG laser device, a water-cooled argon-ion laser device or a water-cooled krypton laser device. The shutter mechanism 22 is opened and closed by the control signal C1 output from the control computer 12 in alignment with the timing of the output of the element hologram image data D5 and introduces the laser light L1 into the optical system of the next stage. Alternatively, it blocks the introduction of the laser light L1 into the optical system of the next stage.

A half mirror 23 splits the incident laser light L1 into transmitted light and the reflected light. Whereas the transmitted part of the laser light L1 is used as the object light L2 which has been described, the reflected part is used as the reference light L3 These object light L2 and reference light L3 are, respectively, introduced into the object optical system and the reference optical system that constitute the next stage.

Such components as mirrors, although they are not shown in the figure, may be placed in the incident optical system for a purpose such as appropriately altering the direction of travel of the laser light L1 in order to match the optical path lengths of the object light L2 and the reference light L3. In addition, the shutter mechanism 22 may be, for example, constituted to drive a shutter blade mechanically or to be an electronic shutter using an acousto-optic modulator; AOM. That is, the shutter mechanism 22 may be any device that can be controlled to be open or closed to block or transmit the laser light L1.

As the object optical system, the holographic stereogram printing module 13 comprises, as shown in FIGS. 4A and 4B, optical components such as a mirror 24, a spatial filter 25, a collimating lens 26, a projection lens 27, a cylindrical lens 28 and a mask 29, with each of these optical components sequentially arranged along the optical axis from the input side.

The mirror 24 reflects the object light L2 that is transmitted through the half mirror 23. The object light L2 reflected by this mirror 24 is incident on the spatial filter 25. The spatial filter 25 is formed, for example, by combining a convex lens with a pinhole, and isotropically expands the object light L2 reflected by the mirror 24 to match the width of the display surface of the transmissive liquid crystal display to be described in the following.

The collimator lens 26 converts the object light L2 expanded by the spatial filter 25 into a parallel beam and guides it onto the transmissive liquid crystal display.

The projection lens 27 makes the object light L2 slightly divergent and projects it onto a cylindrical lens 28. By the slight diverging effect on the object light L2 this projection lens 27 contributes to the improvement of the image quality of the holographic stereogram that is produced.

The object light L2 that is converted into a parallel beam is condensed in the horizontal direction by the cylindrical lens 28.

The mask 29 has a thin rectangular aperture and introduces onto the hologram recording medium 3 the part of the object light L2 condensed by the cylindrical lens 28 that passes through the aperture.

A transmissive liquid crystal display 30 is also installed in a position between the collimator lens 26 and the projection lens 27. Element hologram images are sequentially displayed on the transmissive liquid crystal display 30, based on the element hologram image data D5 supplied by the control computer 12. The control computer 12 supplies a driving signal C2 to the recording medium feed mechanism 34 of the hologram recording medium 3, to be described in the following, and controls the feeding movement of the hologram recording medium by controlling its action.

In such an object optical system the object light L2, which has the form of a narrow beam incident from the incident optical system after splitting, is expanded by the spatial filter 25 and converted into a parallel beam by being introduced to the collimator lens 26. Further, in the object optical system the object light L2 that is made incident onto the transmissive liquid crystal display 30 through the collimator lens 26 is modulated as an image according to the element hologram image displayed on the transmissive liquid crystal display 30, and introduced into the cylindrical lens 28 through the projection lens 27. Then, in the object optical system, the object light L2 that is modulated as an image is made incident onto the hologram recording medium 3 through the aperture of the mask 29 during the time in which the action of the shutter mechanism 22 is to be open, thereby making an exposure and recording in correspondence with the element hologram image. In addition, as the reference optical system, the holographic stereogram printing module 13 has a spatial filter 31, a collimating lens 32 and a mirror 33, with each of these optical components sequentially arranged along the optical axis from the input side.

The spatial filter 31 is formed, in a different way from the spatial filter 25 in the object optical system described in a previous paragraph, for example, by combining a cylindrical lens with a slit, and one-dimensionally expands the reference light L3 split by reflection by the mirror 23 to a prescribed width, specifically to match the width of the display surface of the transmissive liquid crystal display 30.

The collimator lens 32 converts the reference light L3 expanded by the spatial filter 31 into a parallel beam.

The mirror 33 reflects the reference light L3 and guides it to the rear of the hologram recording medium 3 from which it is made incident on the medium.

The holographic stereogram printing module 13 with such an optical system is constituted in such a way that, after being split by the half mirror 23 the optical path lengths of the object optical system through which the object light L2 travels, and of the reference optical system through which the reference light L3 travels, are nearly the same. Therefore, in the holographic stereogram printing module 13 better coherence is achieved, making it possible to produce a holographic stereogram with a clearer reproduced image. The holographic stereogram printing system 10 is, in addition, equipped with a recording medium feed mechanism 34 that intermittently feeds the hologram recording medium 3 by the dimension of one element hologram at a time in the direction indicated by the arrow in FIG. 4B.

The recording medium feed mechanism 34 intermittently drives the translational movement of the hologram recording medium 3 based on the driving signal C2 supplied by the control computer 12. And the holographic stereogram printing system 10, in linked action with this action of the recording medium feed mechanism, operates the shutter mechanism 22 described in a previous paragraph to open the optical path of the laser light L1 based on the control signal C1 supplied by the control computer 12.

In such a holographic stereogram printing system 10, the hologram recording medium 3 is driven to undergo translational movement along a track by an amount corresponding to one element hologram at a time by having the control computer 12 supply driving signals C2 corresponding to each element hologram to the movement mechanism 34 after the completion of the exposure and recording of each element image, and then made to stop with an unexposed part aligned with the aperture of the mask 29. The holographic stereogram printing system 10 is constituted so that the vibrations generated in the hologram recording medium 3 which accompany the translational movement of said hologram recording medium 3 are rapidly stopped. Here, the hologram recording medium 3 is a photosensitive film in the form of a long sheet and, although not illustrated in the figure, it is, for example, wrapped around a supply roll disposed to rotate freely inside a film cartridge that is kept entirely shielded from light. When this film cartridge is mounted in the holographic stereogram printing system 10, the hologram recording medium 3 is paid out into the holographic stereogram printing system 10 and driven to undergo translational movement along the track by the recording medium feed mechanism 34.

In the holographic stereogram printing system 10 the shutter mechanism 22 is made to be open in this condition, letting the object light L2 which is modulated as an image and the reference light L3 be incident on the hologram recording medium 3 from the front and rear sides to expose and record interference fringes corresponding to the element hologram image, In the holographic stereogram printing system 10, upon completion of the exposure and recording of each element image, a driving signal C2 is supplied to the recording medium feed mechanism 34 by the control computer 12 to drive the hologram recording medium 3 to promptly undergo translational movement by a specified amount and stop.

In addition, in the holographic stereogram printing system 10 a development process including a process of UV irradiation of the hologram recording medium 3 and a process of heating the hologram recording medium 3 at a specified temperature is performed by a development process module that is not shown in the figure in order to fixate the holographic stereogram image that is exposed and recorded on the hologram recording medium 3. The holographic stereogram printing system 10 sequentially cuts the hologram recording medium 3, to which the fixation process has been applied, into each holographic stereogram image of a specified size that is externally discharged as a piece of holographic stereogram.

By subsequently performing this action sequentially, the holographic stereogram printing system 10 sequentially exposes and records a plurality of holographic stereogram images on the hologram recording medium 3 in the form of a long sheet to produce a holographic stereogram in which a sheet of holographic stereogram image has been exposed and recorded.

Next, in the following, a specific example of a holographic stereogram that is made as described above and of an illuminating device in which a variety of types of holograms can be mounted will be explained.

The variety of types of holograms include not only the Lippmann-type (volume-type) one-step holographic stereogram with horizontal disparity described above but also include such types as the full-parallax stereogram with vertical disparity also added, holograms produced by actual capture of such objects as models by laser illumination, replicated holograms using these as the original pieces, holograms of the type with surface relief referred to as embossed holograms and diffraction gratings. In the following, unless specifically stated otherwise, the holographic stereogram is also included as a type of hologram in referring to a hologram.

As a first embodiment of the invention, the penlight 500 as shown in FIG. 5 will be explained. The penlight 500 comprises a carrier for the light source with light sources 54a, 54b, 54c and a battery 55 mounted inside, a bracket 60 fixed to the carrier for the light source and a light-guiding diffuser 51 formed as a thin plate of material such as plastic that is movable by means of hinges 53 with the bracket.

There are restricted areas 52 of the light-guiding diffuser 51 where the surface roughness is great, and the light incident from the end face 61 of the light-guiding diffuser 51 does not light the section with little surface roughness, but emerges by diffusion in the normal direction to the surface only in areas with great surface roughness. Although the surface roughness is made great by techniques such as sandblasting, etching and laser marking in this embodiment, various other techniques, not limited to these, may be used. Further, milky white material may be kneaded into the plate in restricted areas. Material such as colorant diffuser material, fluorescent paint, black-light-sensitive material or cellophane may be applied to the plate in restricted areas or entirely. An element such as a diffraction grating or a hologram of the surface-relief type or the Lippmann type may also be used. The shape may be not only a design such as a star-shaped pattern but forms such as letters or numerals.

Figure 9:
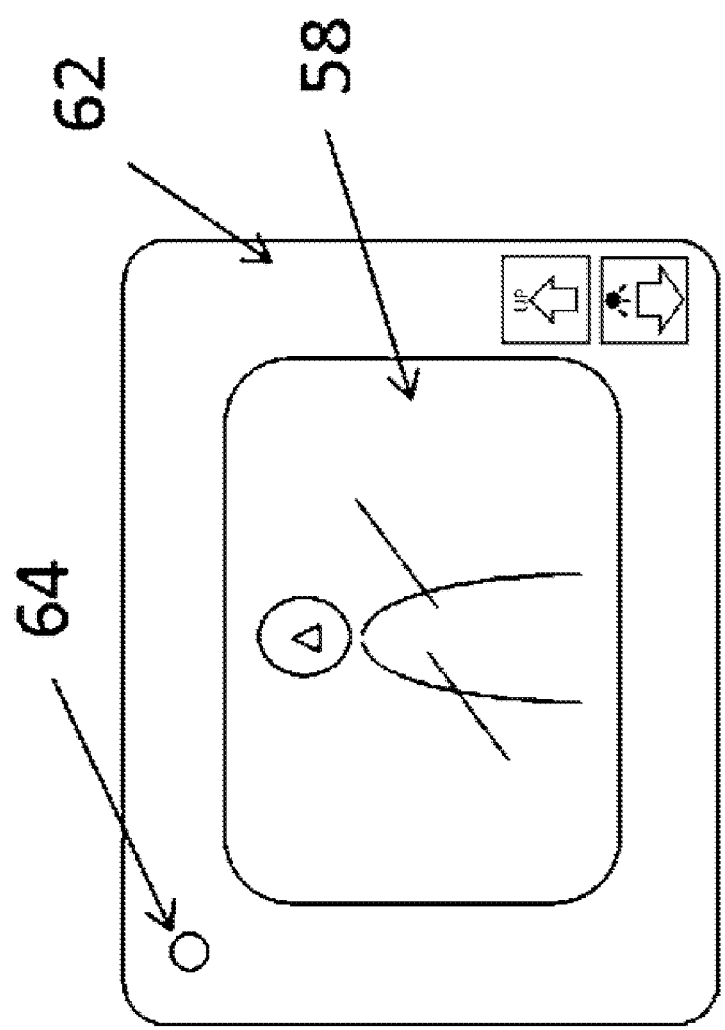
FIG. 9 is a schematic diagram illustrating the view of an exemplary hologram medium from the side of the viewer.

In addition, a reflective hologram is attached either directly, or by means of a frame mount 62 as shown in FIG. 9, by clipping with clips 59. It may not only be attached by clips but also attached directly to the light-guiding diffuser 51 by such compounds as a tackiness agent or an adhesive.

The whole light-guiding diffuser has a rotatable structure by being joined at the hinges 53. In the configuration of FIG. 5(a), the light from the light sources 54a, 54b, 54c, which are devices such as LEDs (Light Emitting Diodes) that are installed inside the carrier for the light source 50, can easily enter the light-guiding diffuser 51 through the end face. And in the configuration of FIG. 5(b), the light does not enter the light-guiding diffuser 51 through the end face, but assumes a position from which it may illuminate the hologram 58 from a predetermined angle. This predetermined angle is made to match the suitable angle of illumination that depends on the hologram 58, and is set in the case of this embodiment to be such that the angle formed between the line joining the light source 54b described above and the center of the hologram 58 and the normal to the surface of the hologram 58 described above is 45 degrees.

The angle between the light-guiding diffuser 51 and the bracket 60 is variable from 0 degree to 45 degrees by rotation, and it is prevented from going beyond this range by stopper a 56 and stopper b 57. That is, the movable configuration can be changed continuously between the first form for illumination primarily for decoration and the second form for viewing the hologram, and it is prevented from reaching a condition outside this range.

In addition, a mechanism that is not shown in the figure allows the configuration to be fixed at 0 degree or 45 degrees unless a substantial external force is exerted. That is, there is a mechanism that allows the configuration to be fixed at each of the positions of the first form for illumination primarily for decoration and of the second form for viewing the hologram.

As the light source, a red LED 54a, a green LED 54b and a blue LED 54c are mounted inside the carrier for the light source. In the configuration of FIG. 5(a) decorative effect may be enhanced by sequential lighting or flashing of each LED.

In the configuration of FIG. 5(b), a full color hologram can be illuminated in the optimal way by turning on all of the red LED 54a, the green LED 54b and the blue LED 54c. The balance between the intensities of the lights of the red LED 54a, the green LED 54b and the blue LED 54c is made to be adjustable to match the characteristics of the hologram. The carrier for the light source 50 has a switch that is not shown in the figure, and in the configuration of FIG. 5(a) the lighting of the LEDs can be started by pressing the switch. By pressing the push-button switch they are made to be automatically turned off after being turned on for a certain length of time. This functionality is for preventing the battery from being consumed in spite of not being used. Alternatively, they may be made to be turned on, after pressing the switch, only during the interval before the switch is pressed again. Or alternatively, they may be made to be turned on only during the time that the switch continues to be pressed.

A switch such as a micro-switch or an optical switch that is not shown in the figure is disposed at the position of the stopper 56b or at the light-incident end face 61, and it may be made possible to change the control of lighting of the light sources 54a-c depending on the position of the light-guiding diffuser 51. In the configuration of FIG. 5(b), in some cases it is desired to view the hologram by making the intensity of the light greater than that in the penlight mode of FIG. 5(a). Since, if the LEDs are lighted with high intensity before taking on the configuration of FIG. 5(b), not only does it result in unnecessary power consumption but also in the danger of directly introducing into the eye of the viewer so much light as to be glaring, it is also possible to control the intensity of the light not to be high in configurations other than that of FIG. 5(b). As in the foregoing, there is a detecting device that is able to distinguish whether the mode is in the first configuration, in which the illumination is mainly for decorative effect, or in the second configuration, in which the purpose is the viewing of a hologram, and by this distinguishing device it is made possible to differently control the light source to be suitable for either the first configuration or the second configuration described above. Alternatively, it may be made possible to control the lighting, without using such switches as a push-button switch or a slide switch, only by moving the position of the light-guiding diffuser. For example, when the configuration is set to be as in FIG. 5(a) the light-guiding diffuser is illuminated by the penlight functionality and, after flashing for one minute with R, G, B switched sequentially, they are turned off. When the configuration is set to be as in FIG. 5(b), R, G, B are lighted together in the high intensity mode to illuminate the hologram and turned off after 30 seconds. This is one example, and numerous variations are possible in the control of the condition and intensity of lighting. That is, the light source illuminating the hologram support unit may be turned on by the configuration distinguishing device described above for a specified length of time after the mode is set to the second configuration in which the illumination is mainly for the viewing of the hologram, and subsequently turned off.

With the first embodiment, the efficiency is high since the same light source can be used for both the penlight functionality and the hologram illumination functionality by having the internally mounted red LED 54a, green LED 54b and blue LED 54c in the light source. In addition to this, there may be installed one or more white LEDs. In this case, variations are possible such as to have, in the configuration of FIG. 5(a), the red, green and blue LEDs individually lighted sequentially with the white LED left turned off and, in the configuration of FIG. 5(b), to have only the white LED lighted, or to, at the same time as having the white LED lighted at high intensity, have the red, green and blue LEDs decoratively lighted at low intensity.

Figure 8:
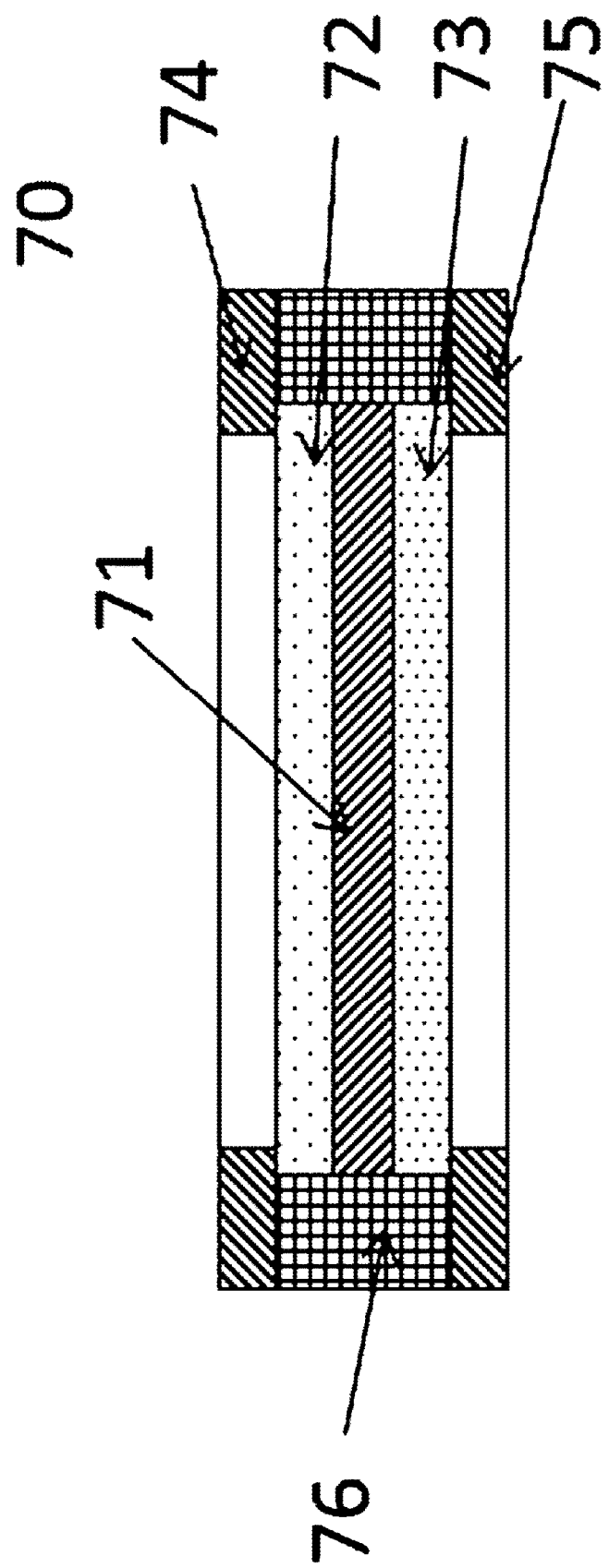
FIG. 8 is a cross-sectional diagram illustrating the layer structure of an exemplary hologram medium.

The layer composition of the hologram used in the first embodiment will be explained by illustrating its cross-sectional diagram in FIG. 8. In the framed hologram medium 70, the hologram recording layer 71 is sandwiched between base films 72, 73 of materials such as PET and bonded with adhesive material 76 for protection of the circumference by the frame 74, 75. The hologram recording layer 71 is transparent and its rear can be seen through beyond the hologram image because both frame A 74 and frame B 75 have windows cut away.

Figure 11:
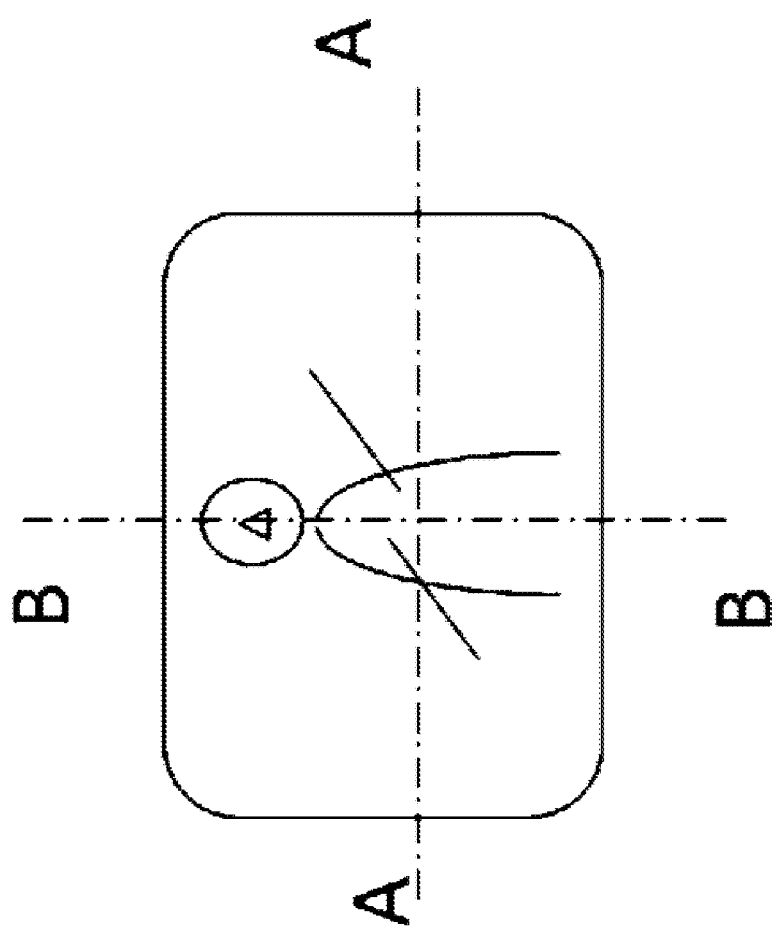
FIG. 11 is a schematic diagram illustrating the importance of the orientation (front and rear, left and right, top and bottom) of the hologram.

For a hologram, it is important which side is front or rear, which side of the image is top or bottom and whether it is illuminated with light from an obliquely upward direction or an obliquely downward direction. Especially for a Lippmann hologram, since the interference fringes are formed by modulation of the index of refraction inside the recording layer, its orientations are difficult to recognize before illumination with the illuminating light. In the case that the hologram layer in the structure of FIG. 8 is transparent, it is difficult to position it correctly, including which side is to be the front or rear side. When a Lippmann hologram image is seen normally by illuminating with light from an obliquely upward direction in FIG. 11, hardly any image is seen when it is rotated about the B axis to invert by 180 degrees. When inverted by 180 degrees by rotation about the A axis, the hologram that is seen as an upside-down image becomes a so-called pseudoscopic image in which the rear/front is also inverted. That is, it is necessary to view under the recommended reproduction condition that is determined at the time of the production of the hologram.

Figure 12:
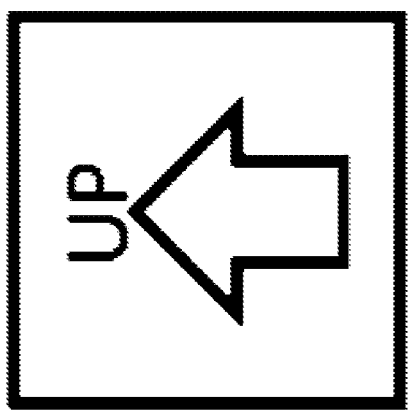
FIG. 12 is a schematic diagram illustrating an exemplary marking indicating the top and bottom of the image of a hologram.

In the present invention, markings as shown in FIG. 12, FIG. 13 are printed on the hologram medium or its frame in order to make the front and rear of the hologram, the upper and lower sides of the image and the direction of the illumination by the reproducing light evident without illumination with the illuminating light. The viewer first holds the hologram medium so that the marking in FIG. 12 is seen to be upright. That is, it is confirmed that the arrow mark is pointing up and the letters "UP" are not seen as a mirror image. Whereas if the printing is on a non-transparent medium the side on which the marking shown in FIG. 12 is seen is on the front side and unmistakably on the side facing the viewer, if the printing is on a transparent medium there can be a mistake in seeing this, and thus the printing is made of letters or a symbol mark such as "UP" that is not horizontally symmetric. If, in addition, there is a marking as shown in FIG. 13, with the arrow mark shown in FIG. 13(a) the image is reproduced by illuminating with the light source from an upward direction on the side of the viewer. With the arrow mark shown in FIG. 13(b) the image is reproduced by illuminating with the light source from a downward direction on the side of the viewer.

Figure 14:
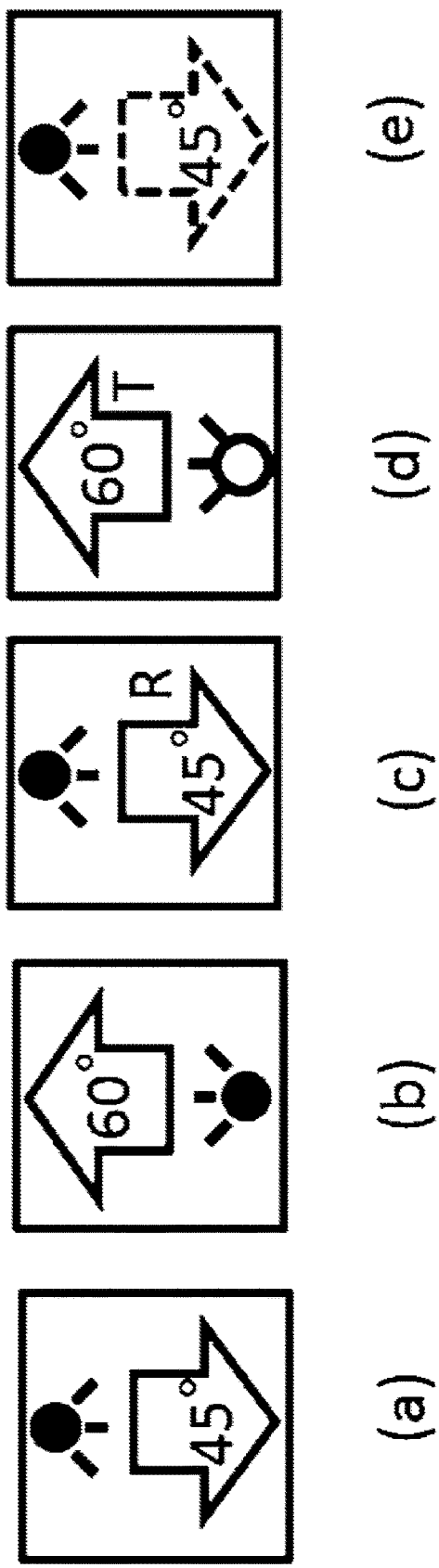
FIG. 14 is a schematic diagram illustrating exemplary markings indicating, in addition to the direction from which the illuminating light is incident on the hologram, its angle and the distinction between transmission and reflection.

Variations of the marking to indicate the optimum incident illuminating light are shown in FIG. 14. The specified direction of the optimal incident illuminating light strictly also includes the angle, and in (a) it is meant that when the viewer views from the direction normal to the hologram the light source illuminates from the direction 45 degrees obliquely upward from the direction normal to the hologram. Similarly, in (b) it is meant that the light source illuminates from the direction 60 degrees obliquely downward from the direction normal to the hologram. Further, in (c) (d), in addition to the angle, the letter R (first letter of "Reflection") indicating the reflection type in which illumination of the hologram is from the side of the viewer or the letter T (first letter of "Transmission") indicating the transmission type in which the illumination is from the side opposite the viewer, has been added. Other types such as the edge-lit type E that is intermediate between the reflection type and the transmission type with the light incident from the end face of the medium may be added. In addition, such descriptions as the recommended type of light source, the wavelength and the degree of parallelism may be given. Further, in case such markings cannot be printed on the hologram on the side from which it is viewed, indication with an arrow marking using dotted lines, as shown in (e), may be made to mean that the description is on the back side.

With regard to the marking shown in FIG. 12, it is not necessarily required if such markings as letters are printed on the face of the hologram or on the face of a medium on which the hologram is attached or inserted. This is because the top and bottom sides and the front and rear sides can easily be distinguished when letters are printed. This is made easier by forming an additional marking of the recommended illuminating light as in FIG. 13, FIG. 14.

In the present embodiment, the frame mount 62 is worked to have a shape that makes it possible to mount it correctly on the illuminating device without a marking of the recommended illuminating light. As shown in FIG. 9, the frame mount 62 for the hologram comprises the frame A 74, the adhesive agent 76 and the frame B 75 as shown in the cross-sectional diagram, FIG. 8, and there is a hole 64 perforated through all these materials.

On the other hand, a cylindrical protrusion 63 is formed in the illuminating device of the present embodiment, and the diameter of this cylindrical protrusion is smaller than the perforated hole 64 in the frame of the hologram medium. The hologram medium 70 is mounted by first putting it in place by having the cylindrical protrusion of the device inserted into the perforated hole 64, and then it is held in place by a clip 59. Incorrect insertion can be prevented because the perforated hole 64 of the hologram medium and the cylindrical protrusion 63 of the illuminating device do not match if an attempt is made to mount with an incorrect orientation in the top and bottom, left and right or front and rear direction and insertion is not possible. The protrusion may be not cylindrical but of such forms as a round hemispherical protrusion or a large cylinder with a large chamfer. In this way, it may act also as a stopper so that the perforated hole 64 and the protrusion 63 are engaged just by insertion by sliding along a guide and pushing in and, at the same time as having their positions determined, they are not naturally disengaged unless force is exerted to disengage them.

In the foregoing, an example was explained in which the orientation of the medium can be defined by a cylindrical protrusion and a perforated hole, but any device to uniquely determine the top and bottom, left and right and front and rear directions, not limited to this example, may be used. For example, the structure of the frame as a whole may be made to be asymmetrical, such as by making one of the four corners have a different shape from the others, with the illumination device being worked to match this shape. In the foregoing example, the hologram base material is made to be transparent so that the background can be seen through, but the background may also be made to be not easily visible by disposing a base material or adhesive material of a black or dark color on the side of the hologram recording layer 72 opposite the viewer. In this case, there are advantages such as better visibility of the hologram image with greater contrast and reduction of errors in distinguishing the front and rear sides. That is, on the side of frame B 75, the hologram part may be left with unworked base material for opacity rather than be made to have a perforated hole.

Various materials such as paper, plastic, metal and wood may be selected for use as frame A 74 and frame B 75 constituting the frame mount 62. Frame A 74 and frame B 75 are pre-connected to each other as a crease, and frame A 74 and frame B 75 can be pasted together in register by folding at the above crease upon positioning the hologram and attaching with an adhesive agent so that they cannot be detached again.

The adhesive agent may be of a type that allows subsequent detachment. In addition, frame A 74 and frame B 75 may also be attached together without using an adhesive agent by working them into shapes for fitting or folding together.

There is a perforated hole or a concavity at position 65 of the frame mount 62 to, by itself, allow attachment of a strap, a key, or an LED light source. If an LED light source of the type of a key holder is used in combination, simplified viewing is also possible. In addition, if the holes 65 of more than one frame mounts of holograms are tied together with a string or an elastic cord, they are not easily mislaid. If they are tied together with the illumination device that is the present invention, it is possible, by the intention of the viewer, to mount for viewing different holograms exchangeably. In order to achieve this purpose, the design of the illumination device of the present invention is devised so that the component that is joined at the position of the hole 65 in FIG. 9 does not touch the illumination device when mounted.

With the first embodiment, the hologram can be viewed without being held manually when it is placed in the configuration of FIG. 5(*b*), as it is, on the surface of such a place as a desktop, by having the bracket 60 and the stopper 56 land on it.

Figure 6:
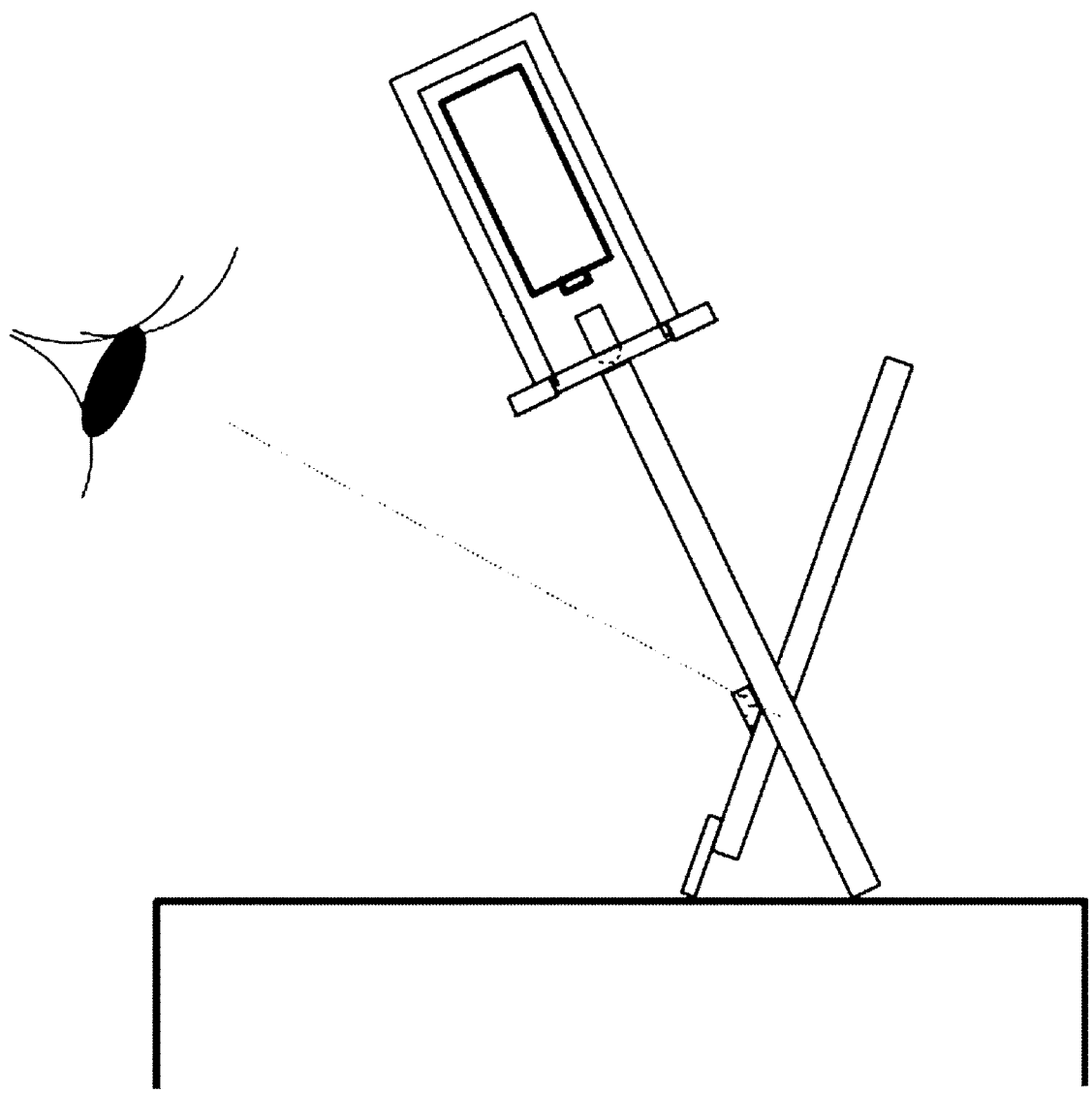
FIG. 6 is a schematic diagram illustrating the viewing of a hologram with the first embodiment set on top of a flat platform.

Presuming the mode of viewing as shown in FIG. 6, the hologram is made to be mounted on FIG. 5(*b*) with an orientation as shown in FIG. 10-*a*. Nearly all holograms in prevalent use are produced with an orientation as shown in FIG. 9 for ease of viewing under illumination from an upward direction with respect to the viewer. For this reason, there is an advantage that even when the hologram medium of FIG. 10-*a* is viewed in separation from the illumination device it is intuitively easy because it just needs to be illuminated by light from the direction 45 degrees obliquely upward, which is the same as for a typical hologram.

When the embodiment illustrated in FIG. 5(*a*), FIG. 5(*b*) is being held manually with the presumption of its use as a penlight, if it is held with the light-guiding diffuser 51 above the carrier for the light source 50 as shown in FIG. 5(*a*) the image is disposed upside down, but this is rather convenient since an image with impact can be reproduced only at the time of viewing and an unwanted image is not reproduced due to the reproduction of hardly any hologram image by external light from an upward direction in the positional relationship of the illumination as a penlight.

Figure 15:
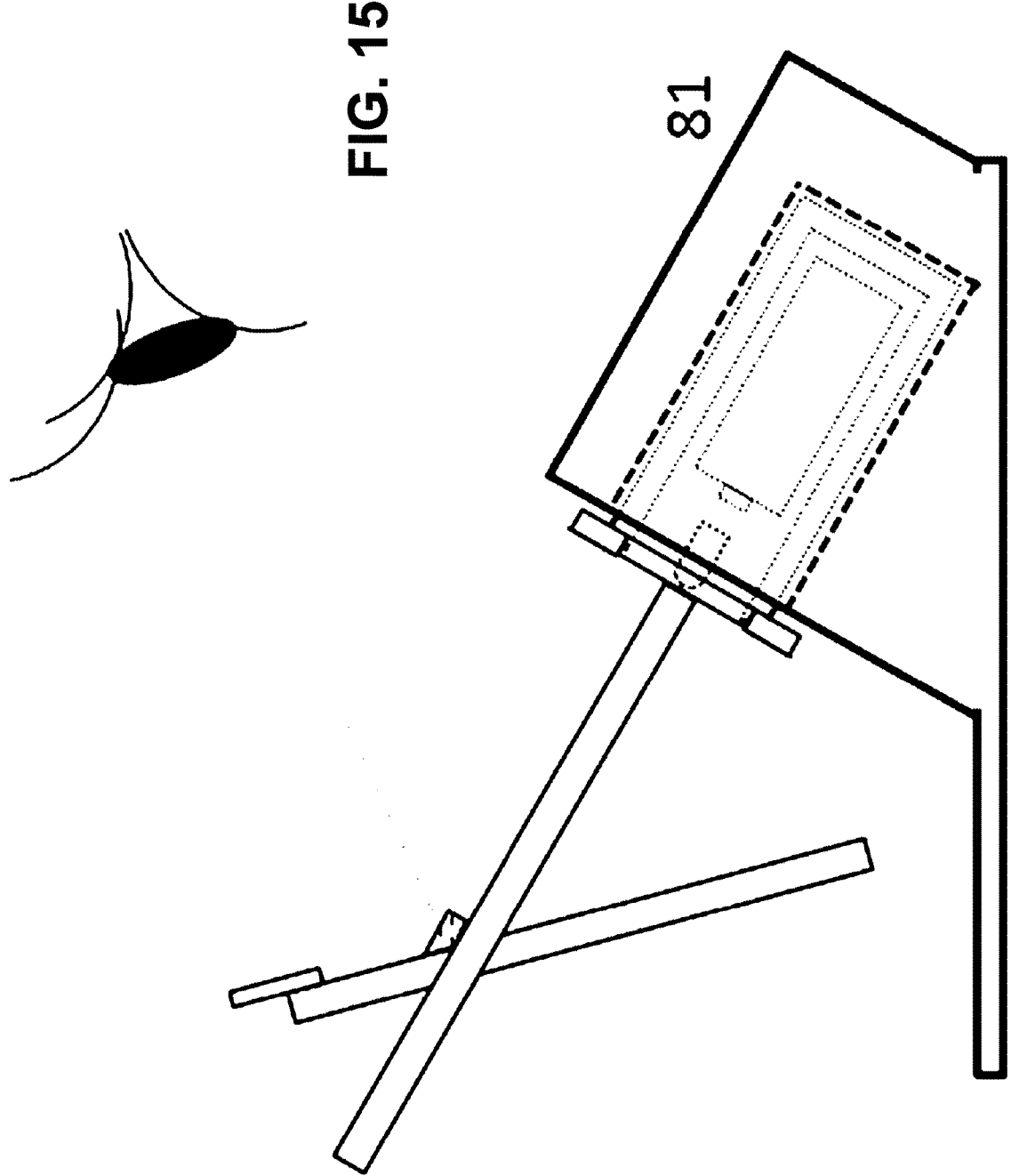
FIG. 15 is a schematic diagram illustrating the viewing of a hologram with the second embodiment set on top of a flat platform.

As a second embodiment of the invention, the case of mounting a hologram medium constituted as in FIG. 10-*b* in the configuration of FIG. 5(*a*) will be explained. When held manually as shown in FIG. 7-*a* in the configuration of FIG. 5(*a*) just as it is, it can be used as a penlight. When made to be in the configuration as in FIG. 5(*b*) and tilted as in FIG. 7-*b*, it comes to be in the configuration for viewing the hologram. FIG. 15 shows an example of inserting the carrier for the light source into a holding platform 81 to fix it so that a configuration similar to that in FIG. 7-*b* can be replicated without manual holding. In the case of this second embodiment, its operation can be made simple because the hologram can be viewed just by changing the angle at which the carrier for the light source is held. Whereas in the case of the first embodiment it can be considered that, when set down as in FIG. 6, if the carrier for the light source is too large compared to the light-guiding diffuser, the stability would be poorer or the carrier for the light source would be obstructive when viewing, in the second embodiment there is greater freedom of design because there is good stability and it can be constituted in a way that is not obstructive when viewing.

In the case of the second embodiment, the problem may arise that the method of viewing is difficult to recognize without combining with the illumination device because the hologram medium used requires the illuminating light to be incident from a direction obliquely downward with respect to the viewer, which is different from the holograms in prevalent use. In contrast, in the present invention, as described above, the viewer is enabled to recognize the optimal illumination condition without confusion because markings such as in FIGS. 12, 13, 14 are indicated on the hologram medium.

In the second embodiment, in the case of mounting on a holding platform 81 as in FIG. 15, external electrical power may be made to be supplied to the carrier for the light source upon mounting, with a power supply transformer and contacts provided on the platform side. In this case, it is also possible to have the light source be lighted without consuming the battery mounted inside the carrier for the light source. In addition, the carrier for the light source may be made to have the functionality of being charged upon mounting on the platform by having an electrically rechargeable storage battery mounted inside. In the example of FIG. 15, the concavity of the holding platform 81 is made so that the handle module can be retained such that, with the presumption that it is substantially cylindrical, the central axis of the cylinder is at an angle in the range of 0 degree to 45 degrees with respect to the horizontal orientation. This is because viewing of the hologram is facilitated when it is placed at an angle to be viewed by looking down from above, and the face on which the hologram is mounted is made to be at an angle of approximately 45 degrees with respect to the handle module.

A third embodiment will be explained by using FIG. 16. In a similar manner as in the first embodiment, the structure is such that the hologram is mounted on a part of the light-guiding diffuser, and the light source from which light is guided by this light-guiding diffuser is integrated with the light-guiding diffuser. Further, the light source for illuminating the hologram is held by a separate carrier for the light source for illuminating the hologram 151 and joined to the light-guiding diffuser plate by a movable element.

When the hologram is not being viewed, the carrier for the light source for illuminating the hologram 151, as shown in FIG. 16(*a*), is housed together with its light source inside the handle module that also houses the battery, and the power supply to the light source for illuminating the hologram is made to be shut off in this configuration.

When the hologram is being viewed, as shown in FIG. 16(*b*), power is supplied to the light source for illuminating the hologram upon moving the carrier for the light source for illuminating the hologram 151 to a specified position.

A fourth embodiment will be explained by using FIG. 17. It is constituted in a similar manner to the second embodiment, and the carrier for the light source 950 is integrated with the battery housing that is also the handle module, and a total of 7 white LEDs L1, L2, L3, L4, L5, L6, L7 are housed, set apart from each other by substantially the same distance and with an orientation to illuminate the hologram part. The condition of the hologram is such that the positional relationship between the position of the eyes of the viewer and the position of the hologram is fixed, and the hologram image changes in accordance with the shifting of the illuminating light. Therefore, by sequentially lighting the light sources from L1 to L7 as in FIG. 18-*a* to FIG. 18-*c*, a visual effect of a movement of the three-dimensional image is obtained without movement by the viewer. When the intensities of the light sources are controlled with gradations as in FIG. 18-*b*, a smoother movement is reproduced than in the case of controlling in the manner of FIG. 18-*a*. Since the intensities of the images reproduced by neighboring LEDs undergo smooth changes the decorative effect is also great. By controlling the intensities of the light sources as in FIG. 18-*c*, it is also possible to reproduce a three-dimensional image or a motion image in continuous loops of forward succession and reverse succession. The explanation was made with white LEDs as L1 to L7, but each of these may comprise a plurality of light emitting devices such as those of a red color, green color and a blue color, and each of the latter may be individually controlled to be lighted. Alternatively, the LEDs themselves may be of white color, with filters of individual colors placed at the positions where each LED is incident to the light-guiding diffuser 951. In this way, reproduction with white light that is suitable for hologram viewing and multicolored lighting that is suitable for decorative effect of the penlight can be realized. Further, the number of light sources is not limited to seven.

By using a plurality of light sources such as L1 to L7 for illumination, when the hologram is illuminated beneficial effects can be expected as described above, and when they are incident to the light-guiding diffuser decorative effects and messaging effects can also be introduced such as, for example, to enhance the lighting of the letters "LIVE!" one letter at a time in the example in FIG. 17. In the mode for effective viewing of a hologram, it is important that mainly only a single light source, or light sources nearly adjacent to each other, is lighted. This is because simultaneous illumination by a plurality of light sources separated in position or angle results in multiple images that are seen. Although a mode for viewing multiple images could be created by intentionally illuminating with a plurality of light sources from different directions to enhance the decorative effect, a mode for hologram viewing in which illumination is only by a single light source is also provided to allow the viewer to make a selection.

In the structure of the fourth embodiment, the bracket 960 can be rotated together at the hinge, and when set down in such a place as a desktop upon putting it in a configuration such as in FIG. 17(c), it is made possible to fix it at an angle for easy viewing. There is a protrusion and a concavity that are not shown in the figure in the movable parts which allow the configuration to be fixed as in FIG. 17(b) or FIG. 17(c) unless an external force is exerted.

Figure 19:
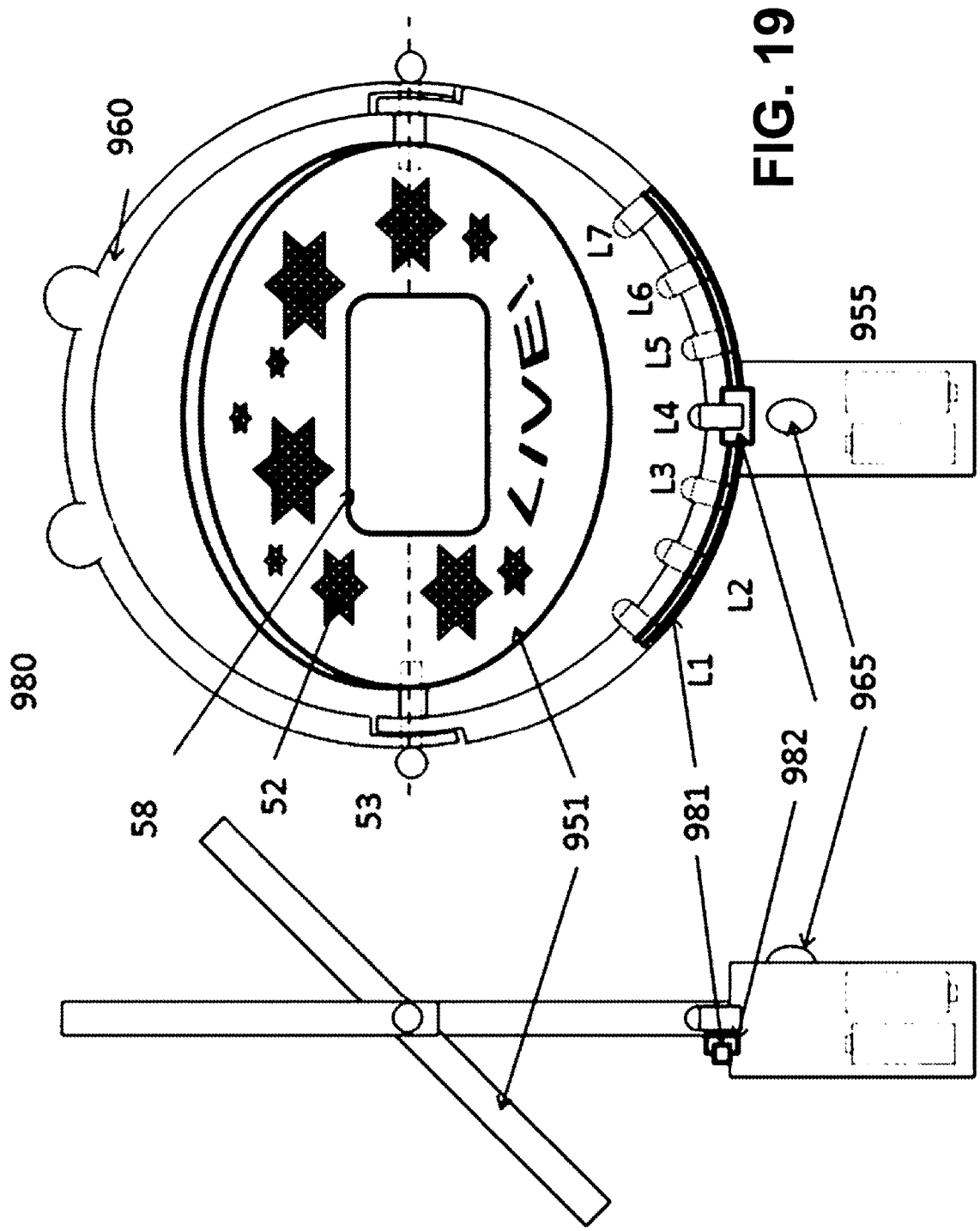
FIG. 19 is a schematic diagram illustrating an exemplary configuration of the fifth embodiment for viewing a hologram.

A fifth embodiment will be explained by using FIG. 19. It is a structure similar to the fourth embodiment and, as the light source, only a single LED at position L4 is mounted on a sliding unit 982 on a slide rail 981, with a construction such that it moves continuously from position L1 to position L7, always facing in the direction of the part where the hologram is illuminated. The friction of the sliding structure is very little, and since there is a weight, not shown in the figure, that is attached to the unit on which the LED is mounted, the LED moves to the lowest position when the entire penlight 980 is tilted, relatively changing the angle of illumination of the hologram. It is supposed that the penlight is waved in venues of events such as concerts, often being used by holding in the hand and tilting to the left and right, which can be expected to be accompanied by, when used as a penlight, decorative effect of illuminating different parts, and when used to view the hologram, image effects of showing different hologram images.

In other variations, instead of relying on gravitational force, elastic force such as the force of a spring, or an actuator such as a motor, may be used for driving.

A sixth embodiment will be explained by using FIG. 20. The penlight 600 comprises a battery 655, a switch 665 and a transparent hollow structure 610 made of transparent plastic material with a thickness of approximately 1 mm attached to the upper part of the handle module 619 that houses such components as an electric circuit that are not shown in the figure. There is an aperture 615 in the face on the far side of the transparent hollow structure 610 as seen from the viewer, and a holder 614 of a hologram is constructed on its external side. The holder 610 of the hologram comprises hologram guides 617, for determining the position of the hologram by supporting it on the left, right and bottom sides, and an opaque member 616, and the hologram can be made to slide into the empty space bounded also by the hollow structure 610. A protrusion is formed on a part of either the side of the hollow structure or the side of the opaque member, or of each of the two sides, and a hole is formed in the corresponding part on the side of the hologram. When the hologram is mounted, because the protrusion on the side of the device engages the concavity on the side of the hologram, the hologram is prevented from becoming naturally dislodged unless force is exerted to dislodge it. In addition, because these protrusion and hole are formed at positions that are asymmetric vertically and horizontally, there is also the advantage that mounting can be done without incorrectly recognizing the front and rear or the left and right sides. By this means it is possible to use a medium with a composition as in FIG. 1 as it is, without using a frame such as in the first embodiment.

A plurality of LEDs are installed such as L1, L2-L7 inside the transparent hollow structure 610. A mirror 613 is disposed in the paths of the light emitted from, among these, LEDs L2, L4, L6 just after being emitted, and these are fixed to have orientations facing the center of the hologram. It is made possible to dispose them in a compact arrangement inside the hollow structure by using the mirror.

Since there is no mirror just after light is emitted from L1, L3, L5, L7, the hollow structure is illuminated from the inside, and elements in the form of prisms that facilitate oblique incidence of light are formed as a sawtooth structure in the vicinity of the part of the hollow structure that is illuminated by the LEDs, so that light is guided at an angle that is nearly parallel to the face of the hollow structure into the interior of the plastic material forming it. Since the angle exceeds the critical angle, if the transparent hollow structure is an ideal specular flat plate, light travels by total internal reflection inside the plastic material, as in the case of light-guiding, from the end face and no light exits from the surface. In the decorative diffuser section 611, minute bumps and dents are worked on the surface of the hollow structure so that only such parts are seen to be lighted.

Although housing the components such as the hologram and the light source inside the transparent hollow structure 610 enhances robustness by impeding the entry of such matter as dust and debris, the impediment in viewing the hologram due to the working of minute bumps and dents 611 is undesirable since the viewer sees the hologram through the hollow structure. Therefore, no light-diffusing element is made to be placed within the zone of directions from at least 20 degrees upward to 20 degrees downward, and from 45 degrees to the left to 45 degrees to the right, with respect to the normal to the center of the area of the hologram on the side of the viewer. This zone is specified since the zone in which a hologram can be viewed is dependent on the specification of the hologram and, in general, holograms for viewing which have viewing angles to the left and right are most often made for 20 degrees upward to 20 degrees downward, and from 45 degrees to the left to 45 degrees to the right. Also the gate used in the plastic molding process is made by locating it to avoid this position. The transparent hollow structure 810 is made of material with a total light transmittance of 80% or greater and a haze value of 10% or less in order to avoid degradation of the brightness and image quality of the hologram, and if there should be components with diffusing properties in some part, the area of the diffusing or opaque parts is kept to be 10% or less in order to avoid significant adverse effects in viewing the hologram.

The haze value is a measure of turbidity (opacity), given by the ratio of the diffuse transmitted light to the total transmitted light. It is specified in JIS-K-7105, JIS-K-7136.

Haze (%)=$Td/Tt$×100 ($Td$: diffuse transmittance $Tt$: total light transmittance)

Further, when there is unwanted reflection at the surface of the material of the hollow structure 810, the image may become darker due to the reduced amount of light contributing to the reproduction of the hologram, unwanted hologram images may be reproduced by the unwanted light, or the unwanted reflected light directly reaching the eyes of the viewer may be disturbing. In order to avoid this, in the present embodiment the surface of the hollow structure 810 is treated with such processes as antireflective coating or fabrication of a moth-eye structure.

Whereas decorative effect as a penlight can be exhibited by simultaneous or sequential blinking of L1, L3, L5, L7, the mode becomes that for viewing the hologram by turning on L4 alone. If L2, L4, L6 are sequentially turned on, it is possible to view the hologram image in motion without a need to move the illumination device or a need for the viewer to move.

In a variation, half mirrors may be placed in all of the paths of the light emitted from LEDs L1-L7 just after being emitted, in position 613, so that part of the light from each LED is used for illuminating the hologram and the remaining light is guided into the optical diffuser of the hollow structure. The ratio of the transmitted light to the reflected light of the half mirror may be different for each LED.

The rear side of the hologram, that is, the side opposite the viewer, is important. If an opaque black component is placed at position 616 in FIG. 20 it is possible to view the hologram image with high contrast, but it is not possible to have a see-through effect as described above. On the other hand, when a handheld penlight is illuminated obliquely by non-diffuse light from below, or when the penlight is turned on in front of a crowd of people, or in the case that, in viewing the hologram there is a person other than the viewer who is facing the viewer, the light may result in excessive glare that is annoying or, in the worst case, even act so far as to damage the eyes. Therefore, in the present invention, examples are shown in which an anisotropic opaque membere or an anisotropic diffusing member is used.

Figure 20:
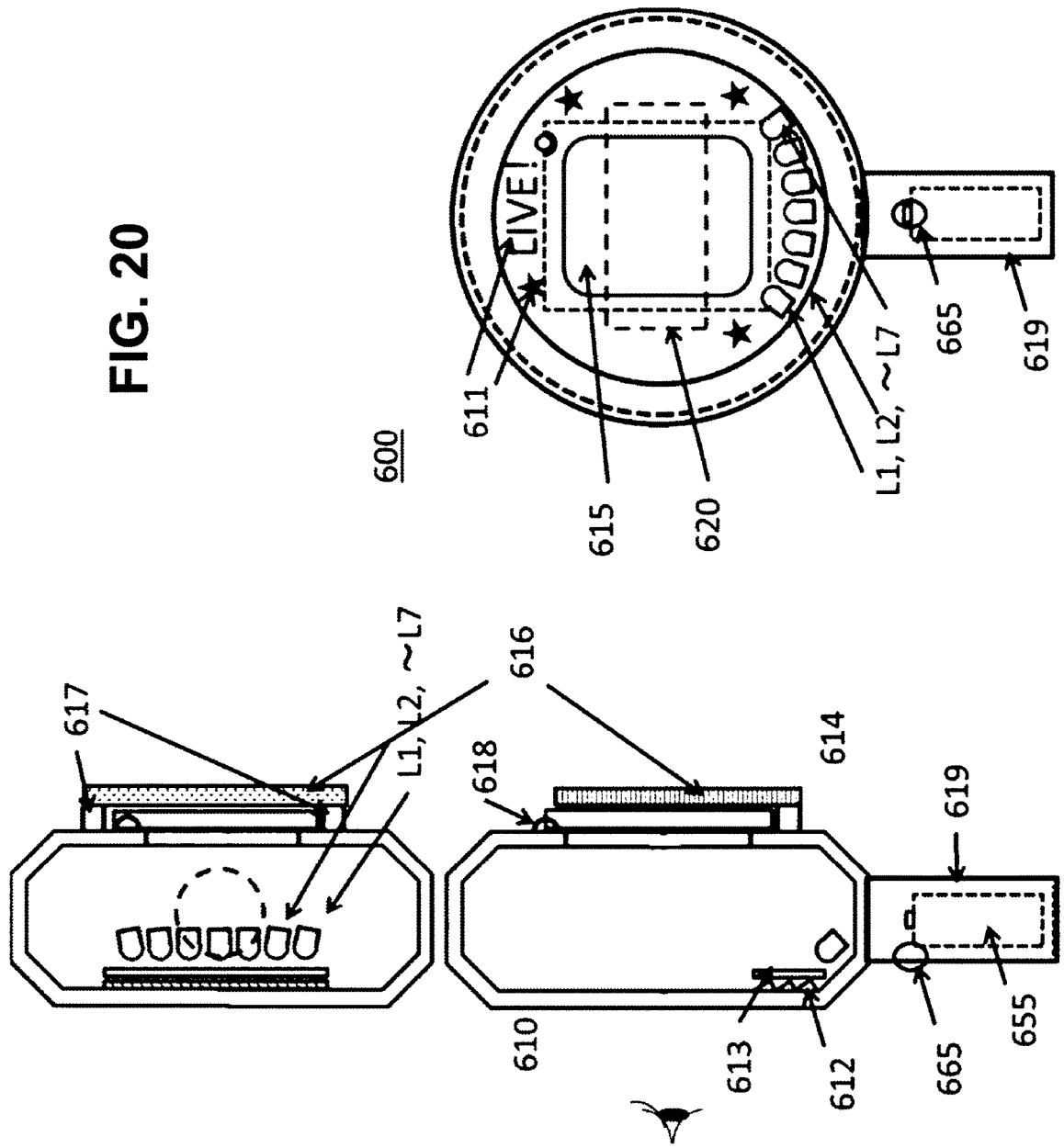
FIG. 20 is a schematic diagram illustrating an exemplary configuration of the sixth embodiment for viewing a hologram.

By placing a louver film that is sold commercially for the purpose of privacy protection for cell phones and monitors at position 616 of the opaque member in FIG. 20, it is possible to, at the same time as creating a condition in which the rear can be seen through from directly in front, block the transmission to the rear of the illuminating light of the LED that is obliquely incident from a downward direction. As an example, the PF series of filters manufactured by 3M can be used.

Next, the case of placing an anisotropic diffusing member at position 616 in FIG. 20 will be explained. When such members as a specklegram, in which speckles have been recorded, or a plastic film in which domains of different refractive indices are distributed in an irregular manner is used, from a certain direction it is seen to be clouded in the same fashion as ground glass whereas from another range of angles it is seen to be like a transparent film. "Lumisty (registered trademark of Sumitomo Chemical Co., Ltd.)" may be cited as a film that has this kind of functionality.

Lumisty is formed by at least two types of polymer compositions incorporating at least either photopolymerizable monomers or oligomers.

As photopolymerizable monomers or oligomers, for example, 2,4,6-tribromophenyl acrylate, tribromophenoxyethyl acrylate, 2-hydroxy-3-phenoxypropyl acrylate, tetrahydrofurfuryl acrylate, ethylcarbitol acrylate, pentenyloxyethyl acrylate, phenylcarbitol acrylate, polyol acrylate, polyacrylate with isocyanurate skeleton, melamine acrylate, polyacrylate with hydantoin skeleton and urethane acrylate can be cited.

As the individual polymer compositions constituting Lumisty, polymer compositions with refractive indices that are different from each other are used. As combinations of individual polymer compositions, for example, two types selected from monomers, or one type of monomer and one type of oligomer, or two types selected from oligomers, or one or more monomers or oligomers further added to these combinations can be cited. From the standpoint of securing adequate angle of diffusion of the diffused light, it is desirable that the difference between the refractive indices of at least two among the types of individual compositions in these combinations is 0.01 or greater.

As a composition constituting Lumisty, such agents as a photoinitiator, a plasticizer, a stabilizer, a filler material with an average particle diameter of 0.05-20 micrometers, an ultraviolet absorber, or a compound without photopolymerizability, may further be included.

When such an optically anisotropic diffuser is placed on the rear face of the hologram, whereas the rear becomes transparent to produce a see-through effect in viewing the hologram image, when seen from the direction of travel of the light from the LEDs there is no sense of glare since it becomes diffuse light and an effective decorative effect as a penlight can be enjoyed.

Figure 27:
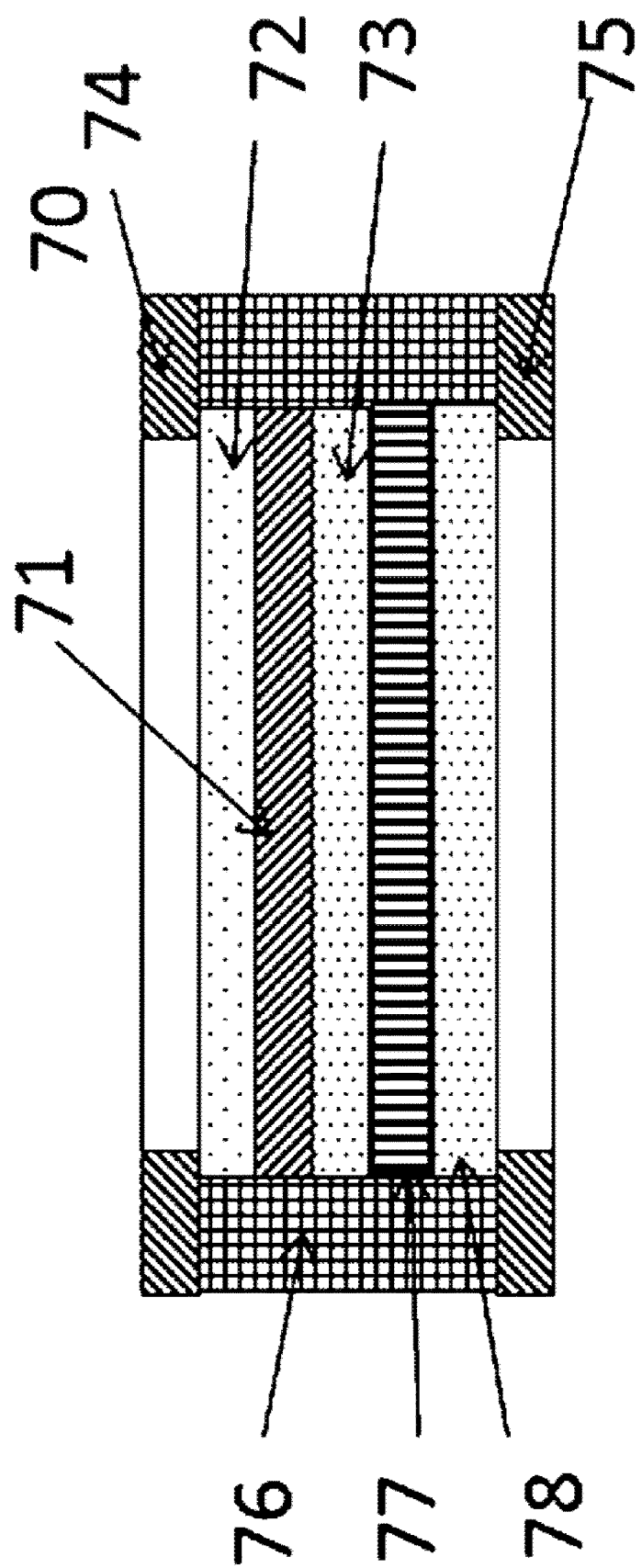
FIG. 27 is a cross-sectional diagram illustrating the layer structure of an exemplary hologram medium.
Figure 28:
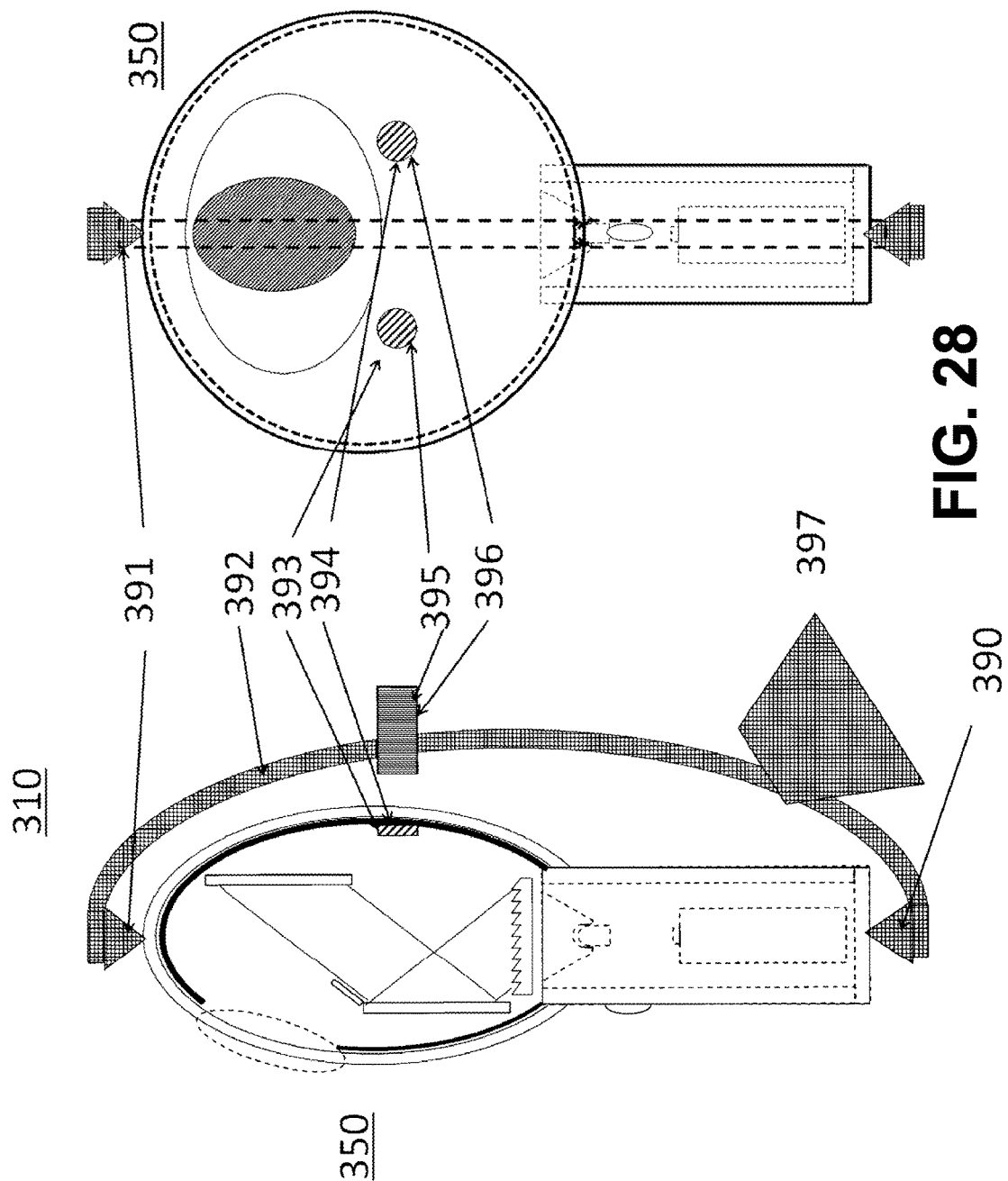
FIG. 28 is a schematic diagram illustrating an exemplary hologram illumination device of the twelfth embodiment.

Although in the sixth embodiment the anisotropic opaque member or the anisotropic diffusing member is placed on the side of the illuminating device, it may also be placed on each hologram. That is, as shown in FIG. 27, in order from the side of the viewer, a transparent base material 72, a hologram medium 71, a transparent base material 73, a louvre film 77 and a transparent base material 78 are disposed. The bonding of the louvre film 77 to the base material 73 without intervening air is facilitated when it is made of silicone rubber. If a louvre film that transmits light from the front side but blocks light incident from an oblique direction is used, although the background can be seen through, the illuminating light from an angle of 45 degrees is blocked so that when a medium is mounted, a person other than the viewer of the hologram can be prevented from being subject to a sense of glare in looking from the rear side.

The specifications such as the angle of the louvre are not limited to what is given here and, for example, one that blocks light from directly in front and passes light from an oblique direction may be installed. In this case, at the same time as improving the contrast in viewing the hologram, it also makes possible the use as a flashlight by letting the light from the LEDs be transmitted untouched. If this anisotropic opaque member or anisotropic diffusing member is placed on the side of the exchangeable medium rather than on the side of the illuminating device, it is made possible to enjoy a different effect with each medium.

Figure 21:
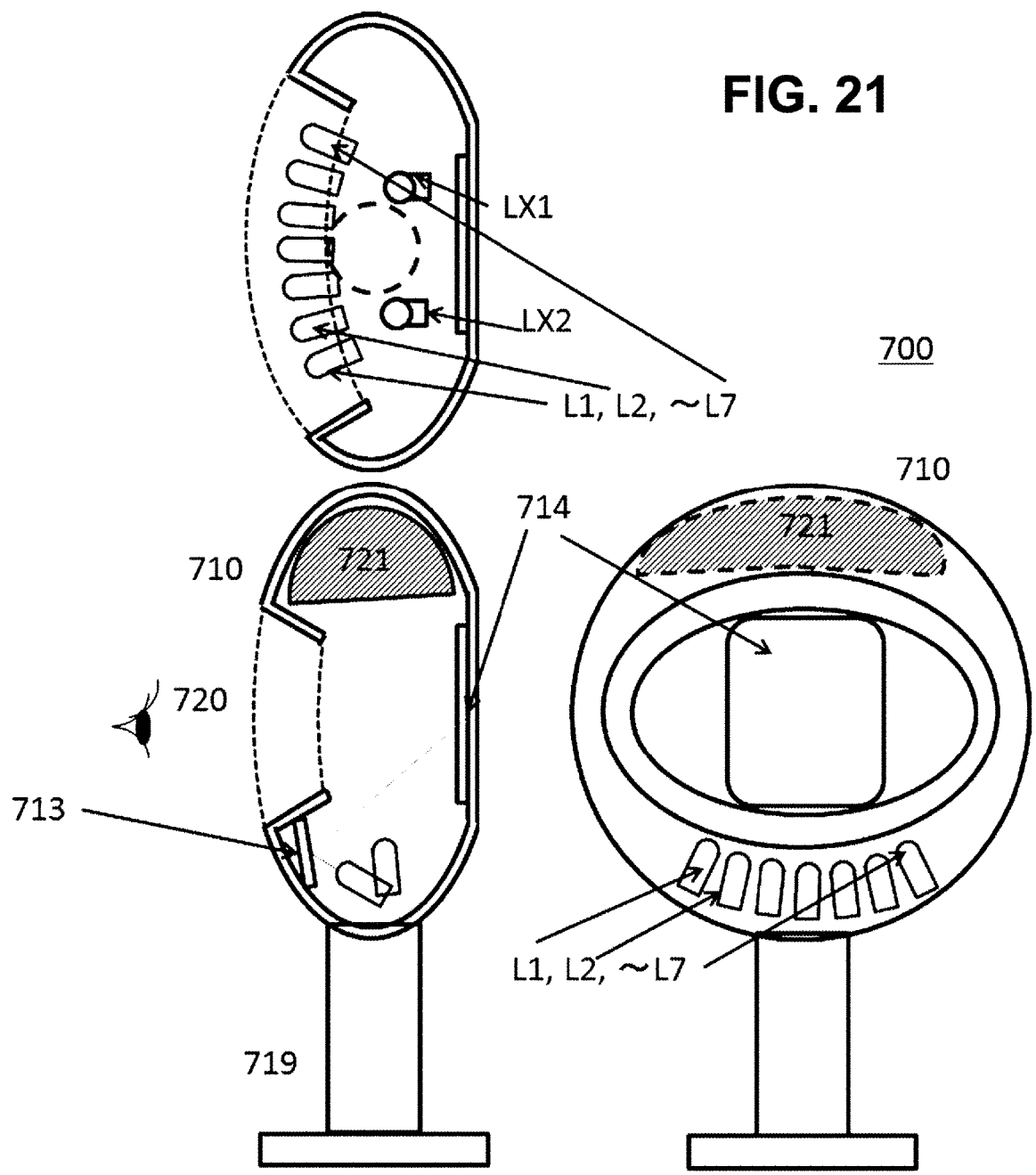
FIG. 21 is a schematic diagram illustrating an exemplary configuration of the seventh embodiment for viewing a hologram.

As has been explained in the foregoing, as an example of placing a functional member such as an anisotropic opaque member or an anisotropic diffusing member, or a simple opaque member or diffusing member on the side opposite the viewer, the functional member may be placed either on the side of the illuminating device or on the side of the hologram medium. Further, the hologram medium, the functional member and the illuminating device are each separate from each other, and the hologram medium and the functional member may be made to be stacked and inserted into the illuminating device. Next, a seventh embodiment will be explained using the penlight 700 in FIG. 21. In contrast to the sixth embodiment, an aperture 720 is disposed in a range for viewing the hologram attached to the part for hologram attachment 714.

This avoids deterioration of image quality even if the surface roughness of the housing of the hollow structure is great. The entire housing may, rather, be an optically diffusing member. In addition, an optically diffusing member 721 in the form of a sponge is installed on top of the housing, and LEDs LX1 and LX2 for illuminating this are installed in addition to the light sources L1-L7 that illuminate the hologram. The lower part of the handle module is made greater in diameter, and viewing is also possible by placement on a surface such as that of a table.

Figure 22:
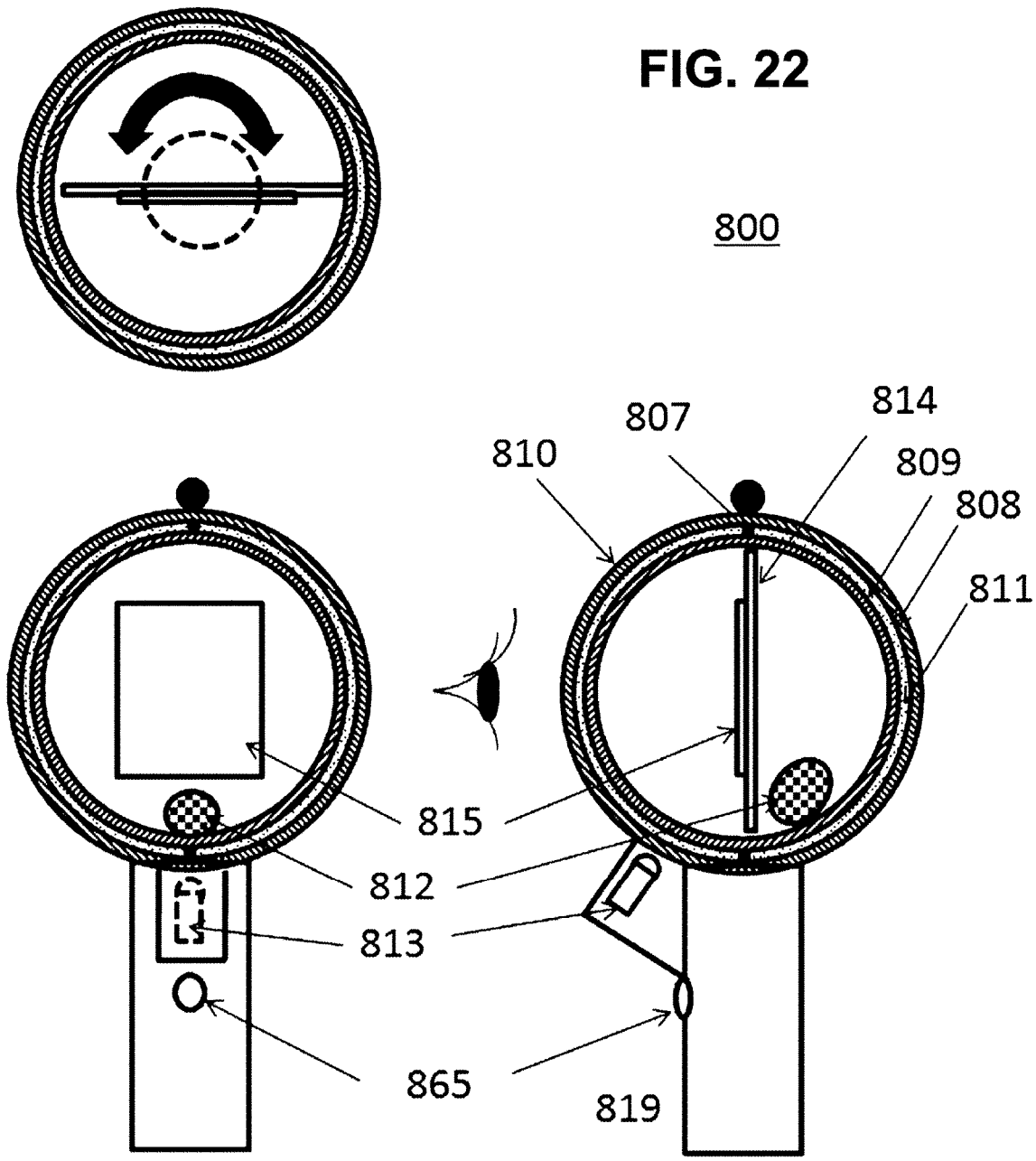
FIG. 22 is a schematic diagram illustrating an exemplary configuration of the eighth embodiment for viewing a hologram.
Figure 23:
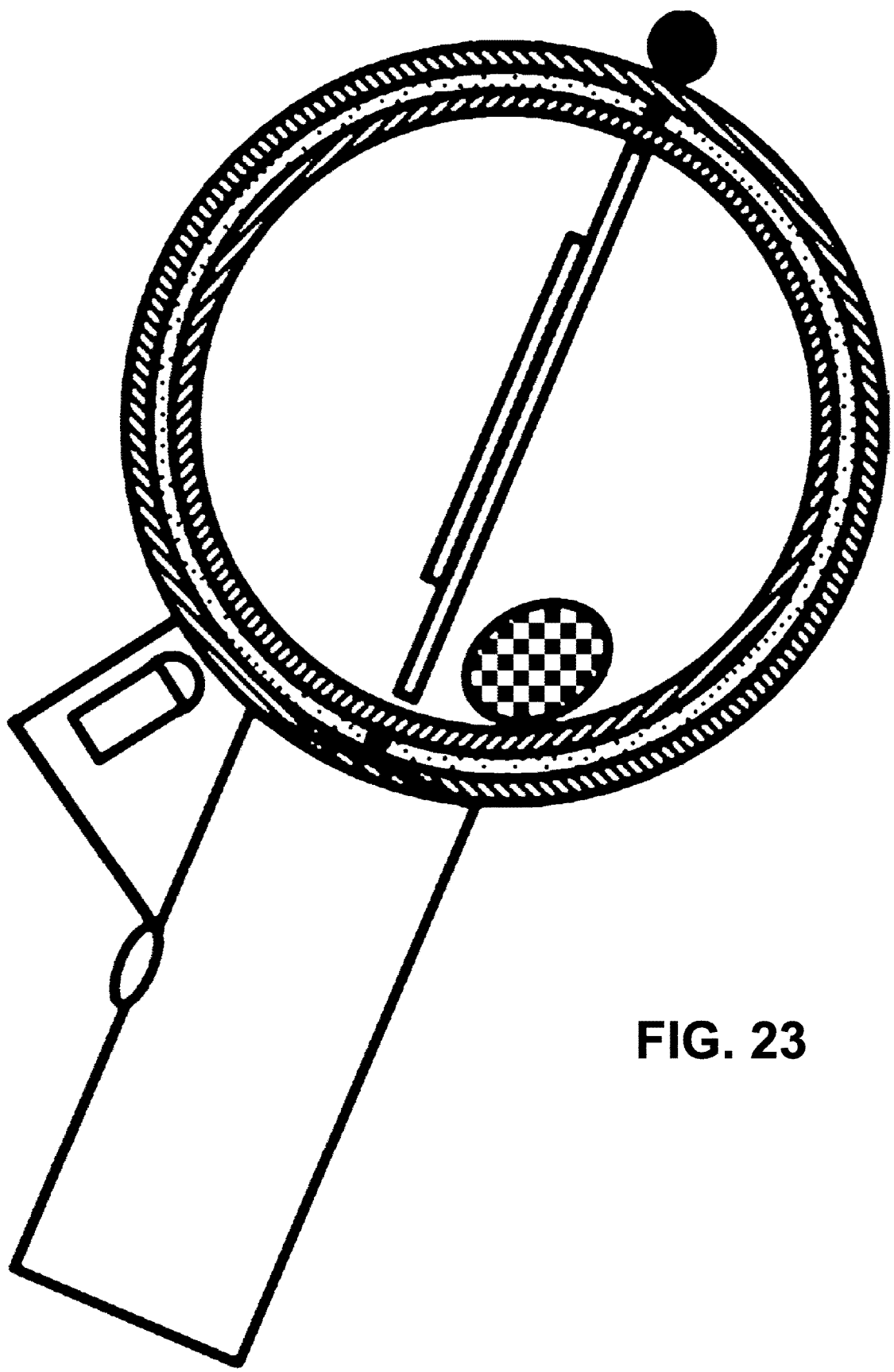
FIG. 23 is a schematic diagram illustrating an exemplary configuration of the eighth embodiment for viewing a hologram, in the case of being tilted.

Next, an eighth embodiment will be explained using the penlight 800 in FIG. 22. A transparent hollow structure A 809 of a smaller size than the transparent hollow spherical body B 810 is supported inside it by a hinge 807 so that it can be rotated, and the interstices between them is filled with a fluid 808. Decorative diffuser chips 811 made of a material with a slightly smaller specific gravity are dispersed in this fluid, so that they collect at the top part in the figure when the penlight is left in a stationary condition. Light from an LED 813 is, to reproduce the hologram image, made to illuminate in the direction of a hologram 815 that is attached to a hologram support unit 814 inside the transparent hollow spherical body A809. When the whole penlight 800 is made to swing, the decorative diffuser chips 811 become dispersed within the fluid, enhancing the decorative effect by causing diffusion of the illuminating light from the LED 813. A weight 812 is fixed in an eccentric position inside the transparent hollow structure so that when held with a tilt as in FIG. 23 and the handle module 819 moved so as to be turned around its axis, it sways in the direction of the arrow illustrated in the top view in FIG. 22, There is a battery and an electromagnet inside the handle module that is not shown in the figure so that, because of attraction and repulsion between the electromagnet and the weight, the hollow spherical body A undergoes a reciprocating rotary motion with respect to the hollow spherical body B to produce the effect of a moving hologram image without any swinging.

Figure 24:
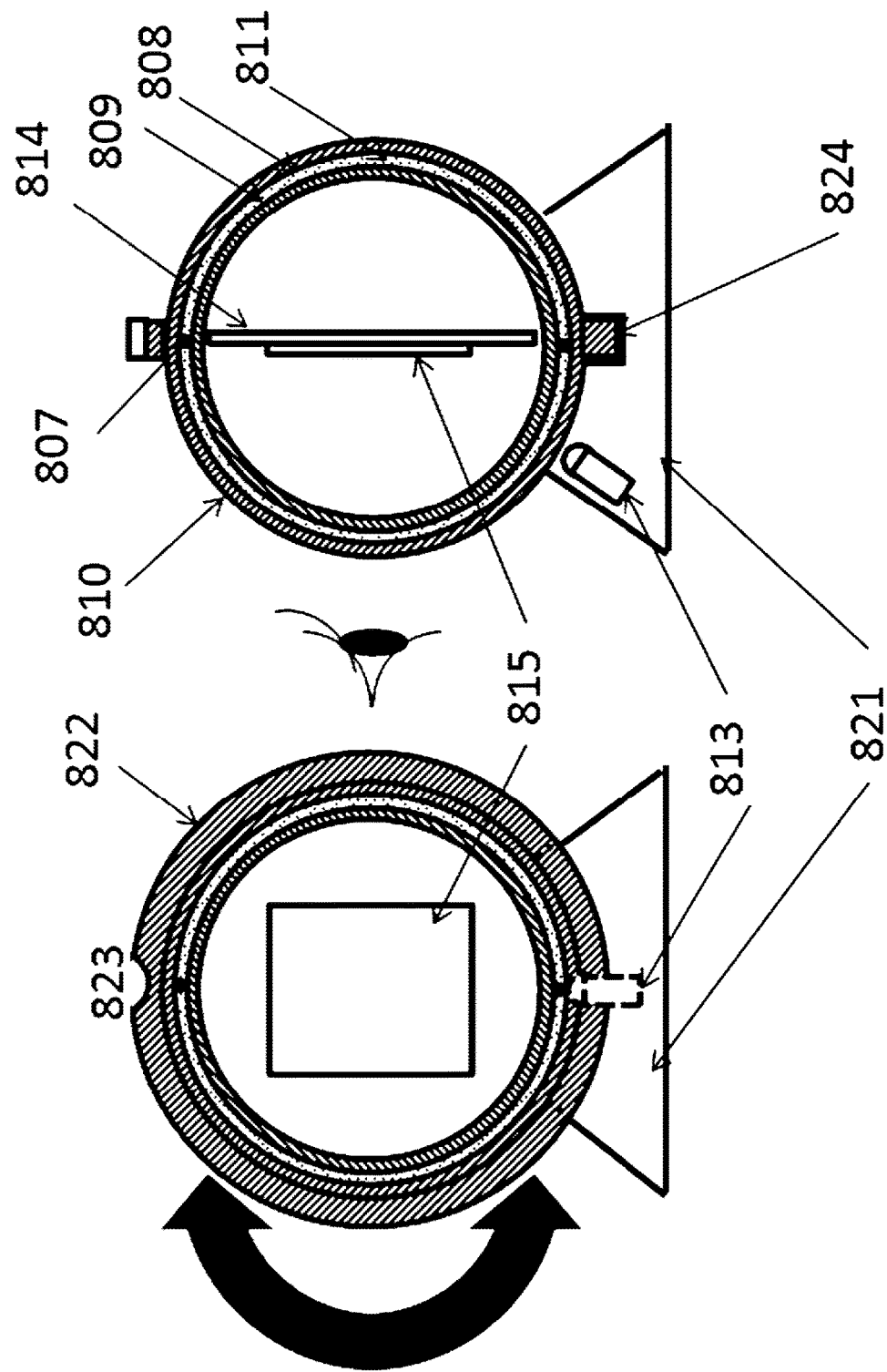
FIG. 24 is a schematic diagram illustrating an exemplary configuration of the ninth embodiment for viewing a hologram.

Next, a ninth embodiment, in the form of a hologram with a fluid hourglass, will be explained using the penlight 800 in FIG. 24. The handle module in the eighth embodiment is replaced by a holding stand 821, and a flange 822 is formed on the outside of the transparent hollow spherical body 810 that is made to be fitted by insertion into the guide 824 formed in the holding stand. A hologram image is reproduced by illuminating the hologram 815 from below at an oblique angle of 45 degrees with light from an LED that is fixed inside the holding stand 821 that is transmitted, in order, through the transparent hollow spherical body B 810, the fluid 808 and the transparent hollow spherical body A 809. In the fluid 808 decorative diffuser chips 811 made with a slightly smaller specific gravity than this fluid are dispersed. When the part inside the transparent hollow spherical body B is rotated by 180 degrees to be upside down with the flange kept inserted into the guide, the decorative diffuser chips 811 at the bottom gradually rise upward. In this process the light incident on the hologram from the LED is randomly blocked and diffused and, after some time, viewing becomes possible as the decorative diffuser chips 811 collect at the top part.

There is a notch in the flange that is not shown in the figure and, since there is also a similar notch diametrically opposite on the other side, the hologram is fixed at the correct position by a positioning component that is not shown in the figure.

Silicone oil is used as the filling fluid. The speed of movement of the decorative diffuser chips can be made slower by using oil with a high viscosity. Although the gap between the transparent hollow spherical body B 180 and the transparent hollow spherical body A 809 is made nearly uniform in FIG. 24, a narrow channel may be introduced to restrict the path of flow. The decorative diffuser chips 811 are not limited to be of solid material such as fine particles, colored particles, phosphorescent particles and fluorescent particles, but may also be a liquid that is immiscible with the said fluid or even a gas. Although decorative diffuser chips 811 with specific gravity smaller than that of the fluid is chosen so that the decorative diffuser chips collect at the top part in a stationary condition, those with, on the contrary, greater specific gravity may also be chosen so that they collect at the bottom part. Further, those may also be chosen with a specific gravity that is nearly the same under normal temperature and pressure, but that alter whether the decorative diffuser chips go to the top or to the bottom according to changes of the environment such as temperature and pressure.

If the hologram is a Lippmann hologram with multiple recordings made with multiple exposures from different angles of the reference light, or one with two hologram sheets with different angles of the reference light stacked together, it is also possible to reproduce a different hologram image when inverted by 180 degrees.

Figure 25:
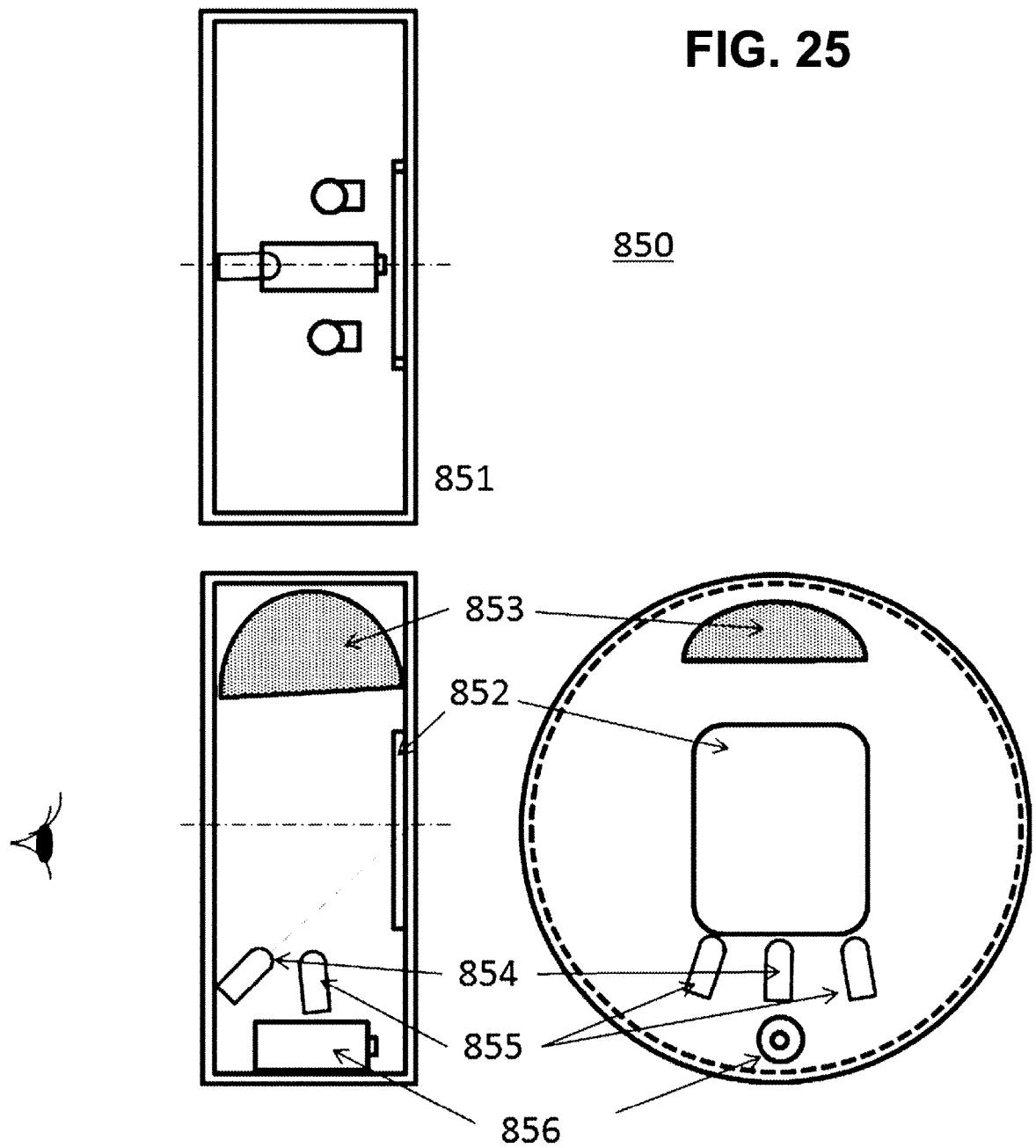
FIG. 25 is a schematic diagram illustrating an exemplary configuration of the tenth embodiment for viewing a hologram.

A tenth embodiment will be explained using the cylindrical illuminating device 850 in FIG. 25. A hologram 852, an optical diffuser 853, an LED 854 for illuminating the hologram, an LED 855 for illuminating the optical diffuser, a battery 856, as well as switches and electric circuitry that are not shown in the figure, are housed inside a transparent cylindrical housing 851. It is possible to view these two modes by switching between them, in such a way that after sequentially illuminating the optical diffuser 853 by light from LEDs 855 in the decorative mode the hologram is illuminated by light from LED 854 in the hologram illumination mode. In addition to being switched by the viewer by means of a switch, the mode may be automatically switched in alternation, for example, to be automatically turned off for the purpose of preventing battery consumption after completion of 10 cycles.

Figure 26:
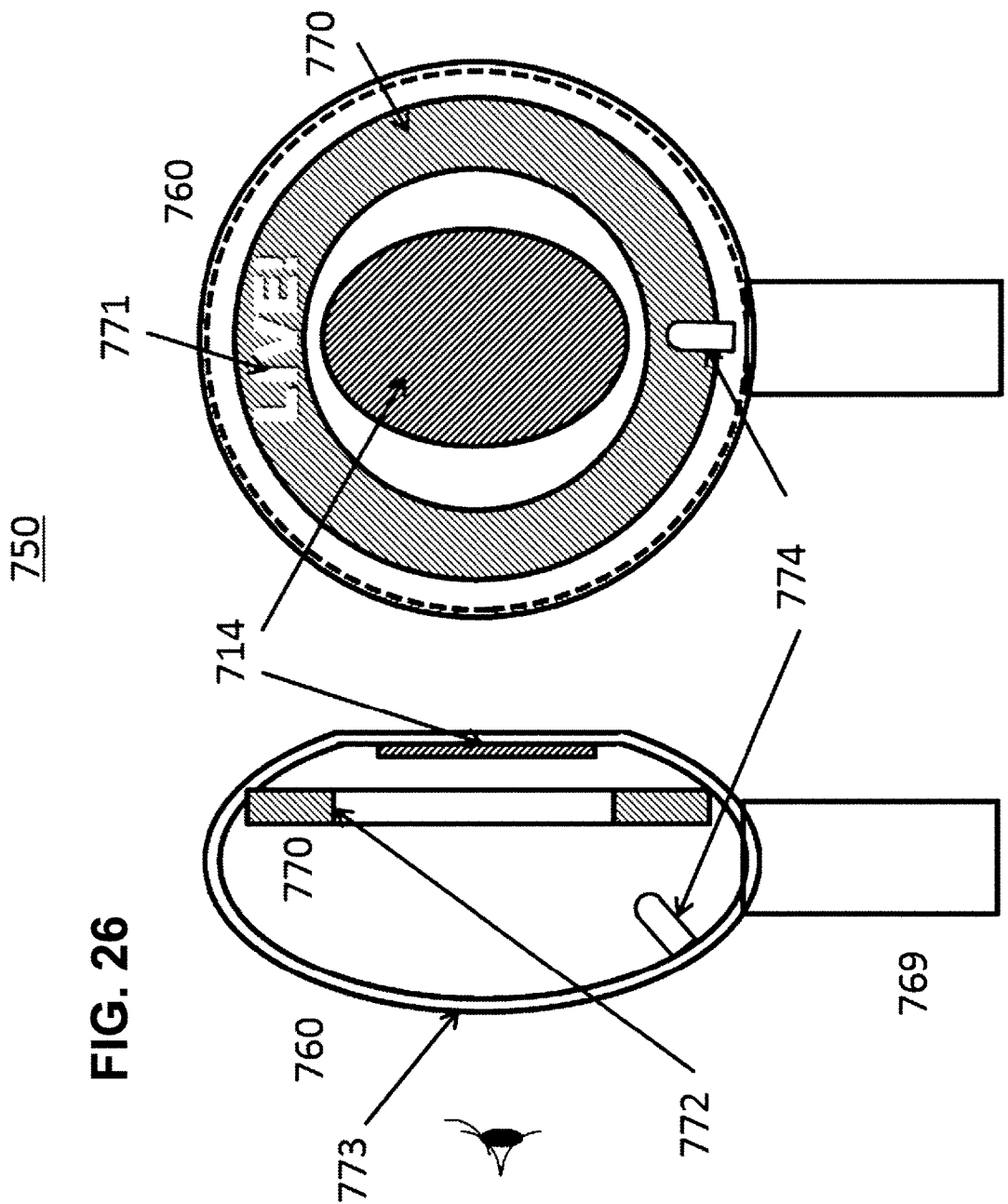
FIG. 26 is a schematic diagram illustrating an exemplary configuration of the eleventh embodiment for viewing a hologram.

An eleventh embodiment will be explained using the penlight 750 in FIG. 26. An LED 774 with wide directional characteristics such that the angle at half-maximum is greater than 70 degrees is used as the light source to illuminate mainly the hologram, but a decorative effect is provided by also illuminating the optical diffuser 770 that is placed in the periphery. Minute bumps and dents are worked, with large surface roughness, on the surface of the optical diffuser 770, and letters 771 are formed in some areas by parts with small surface roughness. Further, since the optical diffuser 770 has a thickness of, for example, 3 mm and the inside wall next to the hollow is mirror polished, the light incident from this inner wall has an internally reflected component that facilitates lighting in entirety. The light from the light source 774, in addition to being emitted from the surface of the optical diffuser, also has a part that is incident to the inside from the inner wall 772, with which the diffusion effects from the optical diffuser can be viewed at the same time as the hologram is reproduced. Since only a single light source is used for illumination, most of the optical flux distribution is used for illumination of the hologram and the remaining light is effectively used to create an effect of decorating the reproduced image of the hologram in positions that are not obstructive to the viewing of the reproduced image of the hologram.

The front face 773 of the housing is composed of a curved surface with curvature. In this case, the presence of a difference in curvature between the external side, that is, the side of the viewer and the internal side, the side of the hologram, results in enlargement or diminution, or distortion of the image by acting in the manner of a lens effect. In the case that a known distortion is generated, it is also possible to perform image processing in advance on the image data for recording to compensate for the distortion.

A twelfth embodiment will be explained using the hologram illumination device 300 in FIGS. 28-31. The hologram illumination device 300 is composed of a penlight module 350 and a holder stand 310 that are detachable.

Figure 29:
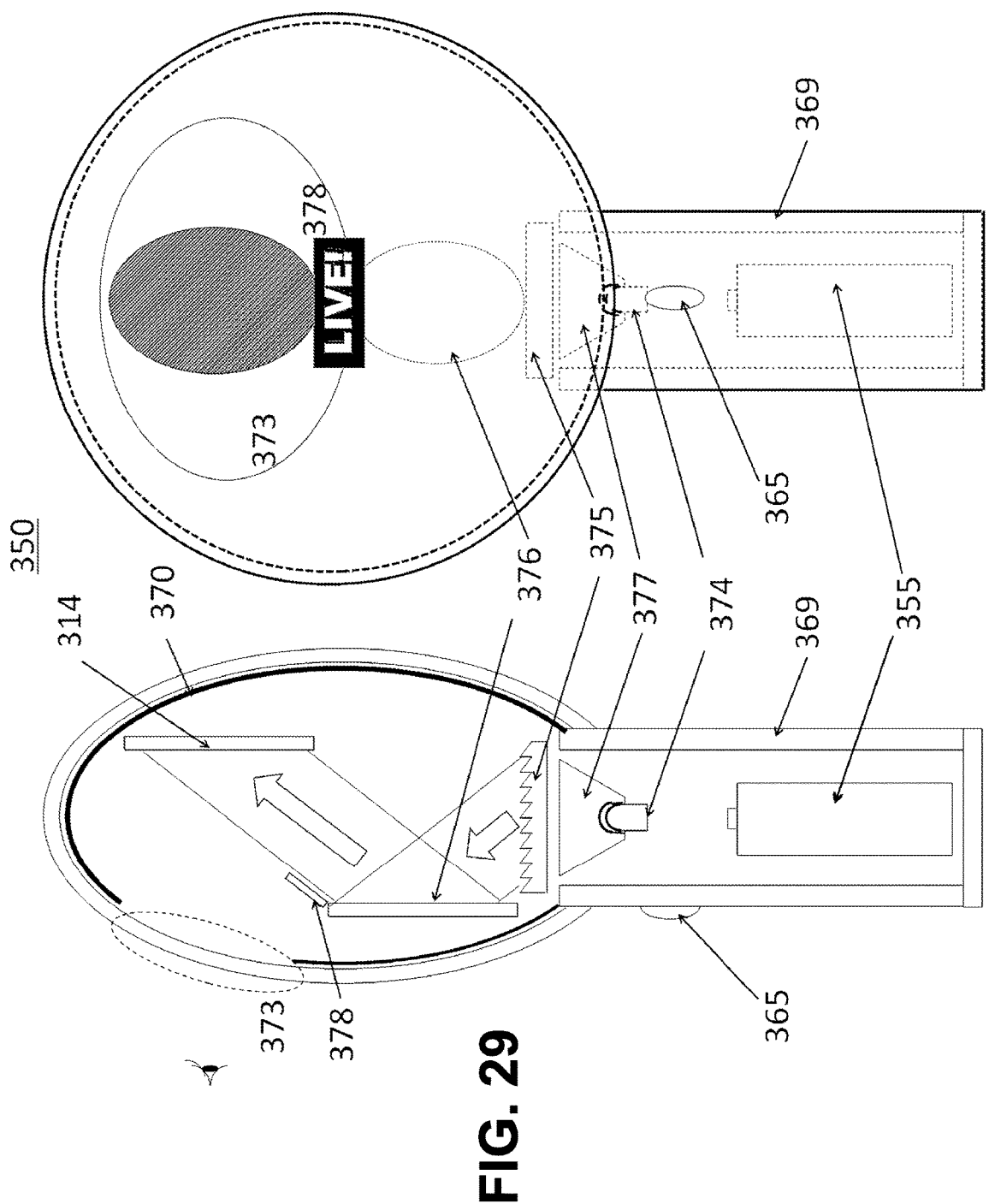
FIG. 29 is a schematic diagram illustrating, of the hologram illumination device of the twelfth embodiment in the configuration for viewing, in which the device in the form of a penlight has been removed from the holding stand.

First, the penlight module 350 will be explained using FIG. 29. The handle module 360 is formed as a cylinder and such components as an LED light source 374 in the vicinity of the central axis of this cylinder to emit along the central axis, together with a battery 355, a switch 365 and an LED driving circuit that is not shown in the figure, are mounted inside the cylinder. The light emitted in the direction of the axis from the LED light source 374, after becoming parallel light, or light with parallelism adjusted by means of a lens 377 so that a specified area can be efficiently illuminated at a certain position at a specified distance, is incident on a prism sheet 375. The prism sheet is made of a transparent optical plastic material with a sawtooth cross-section with a pitch of, for example, on the order of 0.01 mm to 1 mm, preferably approximately 0.1 mm, and is capable of being flexed in a specified direction, depending on the angle of its slope. In the example in FIG. 29, the light, after being first deflected toward the side of the viewer by the prism sheet, is deflected away from the viewer by the reflecting mirror 37 to reach the hologram 314. Since the angle of incidence of this illumination of the hologram is made to be the optimal angle for viewing the hologram, a bright image can be viewed from the vicinity of the direction directly in front of the hologram.

The lens 377, the prism sheet 375, the reflecting mirror 376 and the hologram support unit are mounted on an oblate spheroidal housing 360, and the housing 360 and the handle module are made to be attachable by a threaded part that is not shown in the figure. The housing 360 is made to be transparent only in the part 373 for viewing the hologram and since optically diffusive components are coated on, or placed adjacent to, the remaining part, a decorative effect can be provided by illumination with the part of the light that is not utilized for illumination of the hologram or with a separate light source that is not shown in the figure.

If the light from the LED light source 374 passes through the transmissive components such as the lens 377 and the prism sheet 375 and directly exits from the optical aperture 373 of the housing, there may be excessive glare or degradation of the decorativeness, but light that is so bright as to be glaring is made to be not directly visible, even in intentionally looking into the light source, by installing a shielding plate 378.

The shielding plate 378 may be decorated with such features as letters. It is not necessary for the shielding plate 378 to be optically totally opaque, and it may be made of a diffusive body or have a partial optical aperture.

Figure 30:
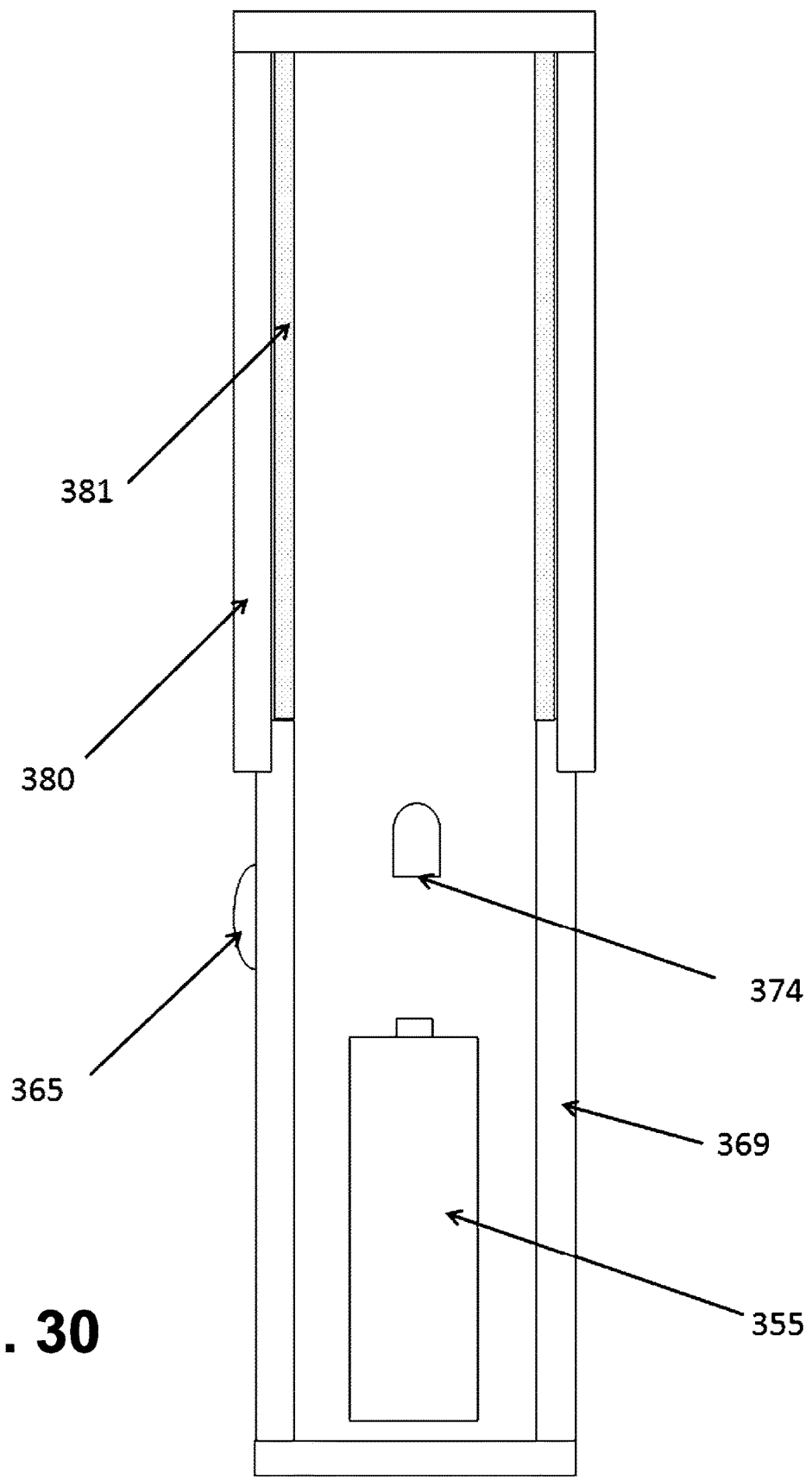
FIG. 30 is a schematic diagram illustrating that the penlight housing of the hologram illumination device of the twelfth embodiment can be modified for use as a conventional penlight.
Figure 31:
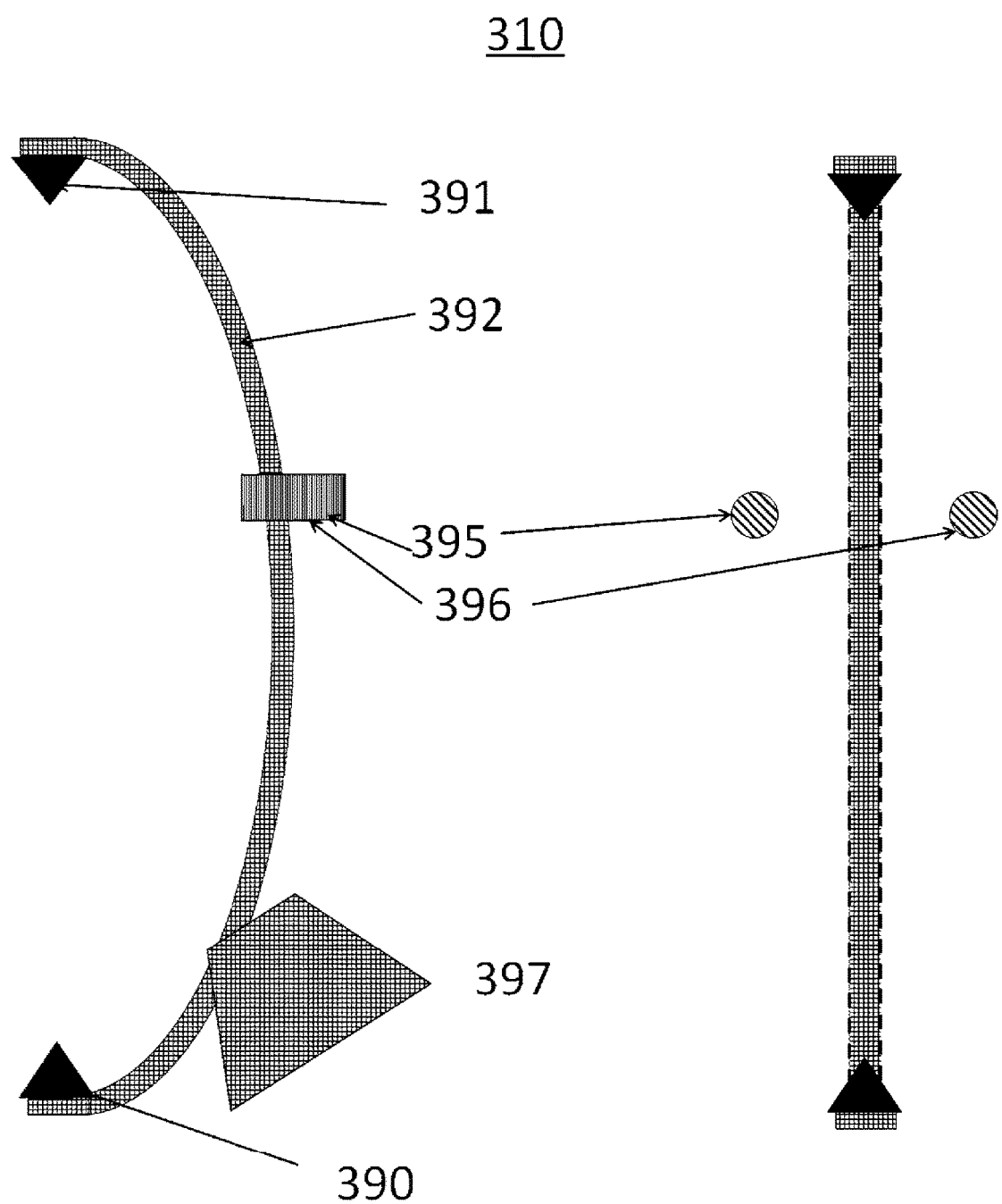
FIG. 31 is a schematic diagram illustrating, of the hologram illumination device of the twelfth embodiment, the holding stand alone.
Figure 32:
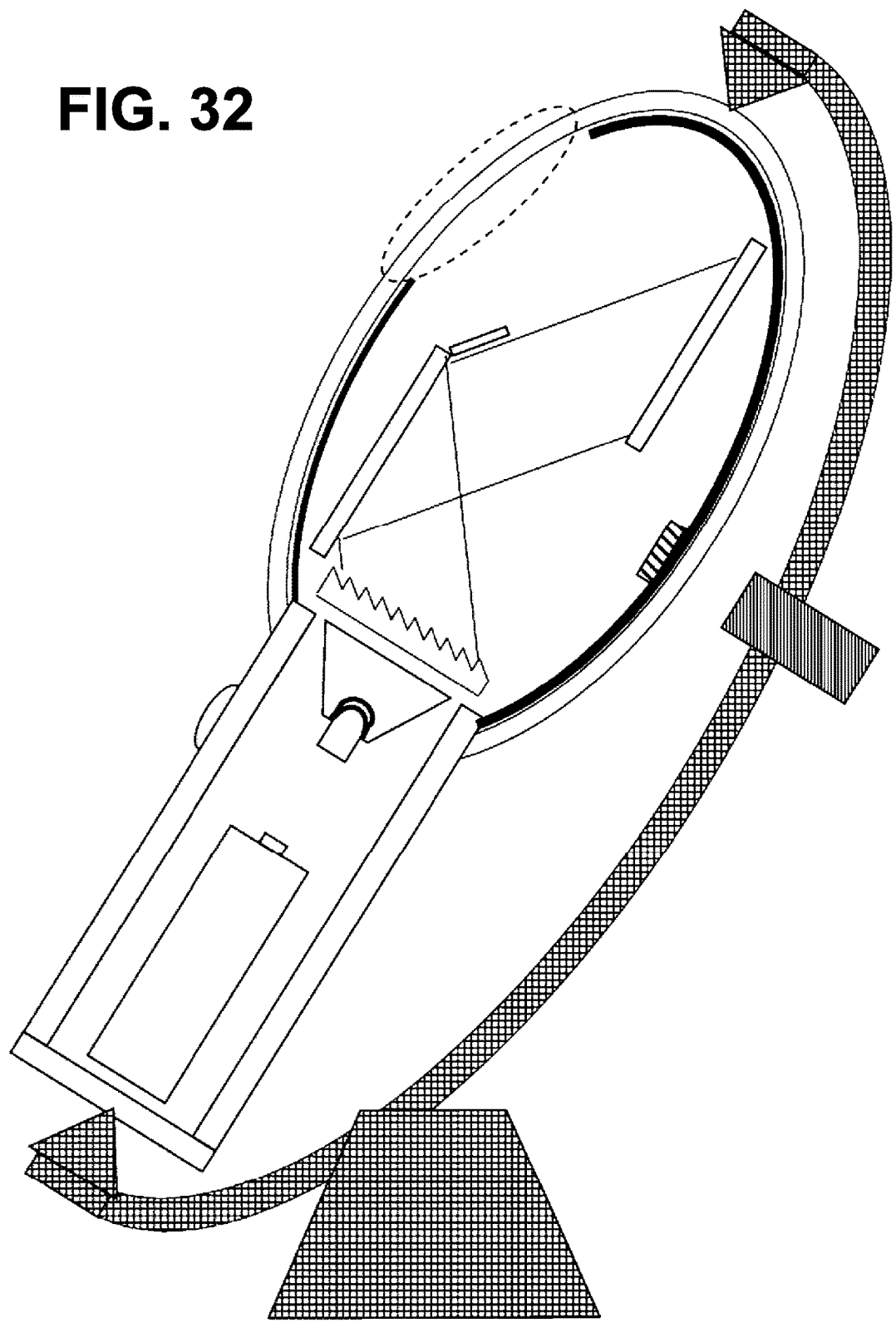
FIG. 32 is a schematic diagram illustrating, of the hologram illumination device of the twelfth embodiment, the configuration for viewing by setting in a holding stand.

In the present invention, the reason for first deflecting the light from the light source that is emitted in the direction of the cylindrical axis of the handle module is that in a great majority of existing flashlights and penlights, light is emitted in the direction of the cylindrical axis of the handle module. That is, it can be used as a flashlight by detaching the housing 360 in FIG. 29 from the threaded part that is not shown in the figure, and also as a conventional penlight by, in replacement, mounting another cylindrical diffusive body such as in FIG. 30. In FIG. 30, the cylindrical diffusive body is, or is similar to, a transparent plastic cylinder 380 with a diffuser sheet 381 placed in cylindrical form inside.

In other words, it is made possible to easily put together a device for viewing a hologram by installing the housing 360 of the present invention with the necessary optical components, light diffuser and hologram mounted inside.

When a high-intensity power LED rated at 1W or greater is used as the LED light source 374, in some cases there is a sense of glare when the light enters the eyes directly without diffusion or blocking. Since, if the replacement as described above is left up to the user there is a possibility that damage is caused in the eyes by accidentally looking at the bright light against intention during the replacement, a switch is put in the mounting part that makes an interlock mechanism function to disable light emission in the condition of the housing 360 in FIG. 29 or of not having the plastic cylinder 380 mounted.

Although, in the present embodiment, a prism sheet is used to deflect the light emitted in the direction of the cylindrical axis and a reflecting mirror is used to deflect it again in the direction of the hologram, for either of these, components may also be used such as a reflecting mirror, a prism in block form, a lens, a diffraction grating, a holographic device, an electro-optic modulation device or an acousto-optic modulation device.

Although the relative relationships of position and angle between the hologram and the light source are fixed in the penlight 350 by itself, when the whole penlight 350 is placed on the dedicated holding-stand-cum-rocking-device, motion can be viewed also by a stationary viewer. An example of the holding-stand-cum-rocking-device will be explained using FIG. 28. There are pivots 390, 391 constituted to enable the penlight 350 to rotate with little friction about the central axis of its handle module or about an axis in the vicinity of a central axis that includes the face of the hologram. The pivots 390 and 391 are connected to each other on the back side relative to the viewer by a support 392, and the penlight 350 is made to be detachable by the elasticity of the support 392. A small depression is formed in the part of the penlight 350 that adjoins the pivot, lowering the friction during the rotational swinging by reducing the area of contact, in addition to resulting in the position being defined. The foot 397 is made relatively heavy in the whole illumination device so that stable support with a low center of gravity is possible and, in addition, adjustment is made possible to view from a direction on the order of 5-45 degrees upward. Weights 393, 394 are placed inside the penlight 350 that undergo rocking motion as a rigid body pendulum with the axis of rotation as the fulcrum. Further, the weights 393, 394 are made of magnetic material and electromagnets 395, 396, including coils, are installed, making it possible to cause a continuous rocking motion by controlling the current in the electromagnets, including its direction, at a frequency close to the natural rocking frequency of the penlight 350 as a rigid body pendulum.

That is, continuous rocking as described above can be realized by repetitive control to alternate a time period in which current is made to flow in the electromagnets so that the weight 393 and the counter-posed electromagnet 395 repel each other and/or the weight 394 and the counter-posed electromagnet 396 attract each other, with a time period in which, conversely, current is made to flow in the electromagnets so that the weight 393 and the counter-posed electromagnet 395 attract each other and/or the weight 394 and the counter-posed electromagnet 396 repel each other.

Figure 33:
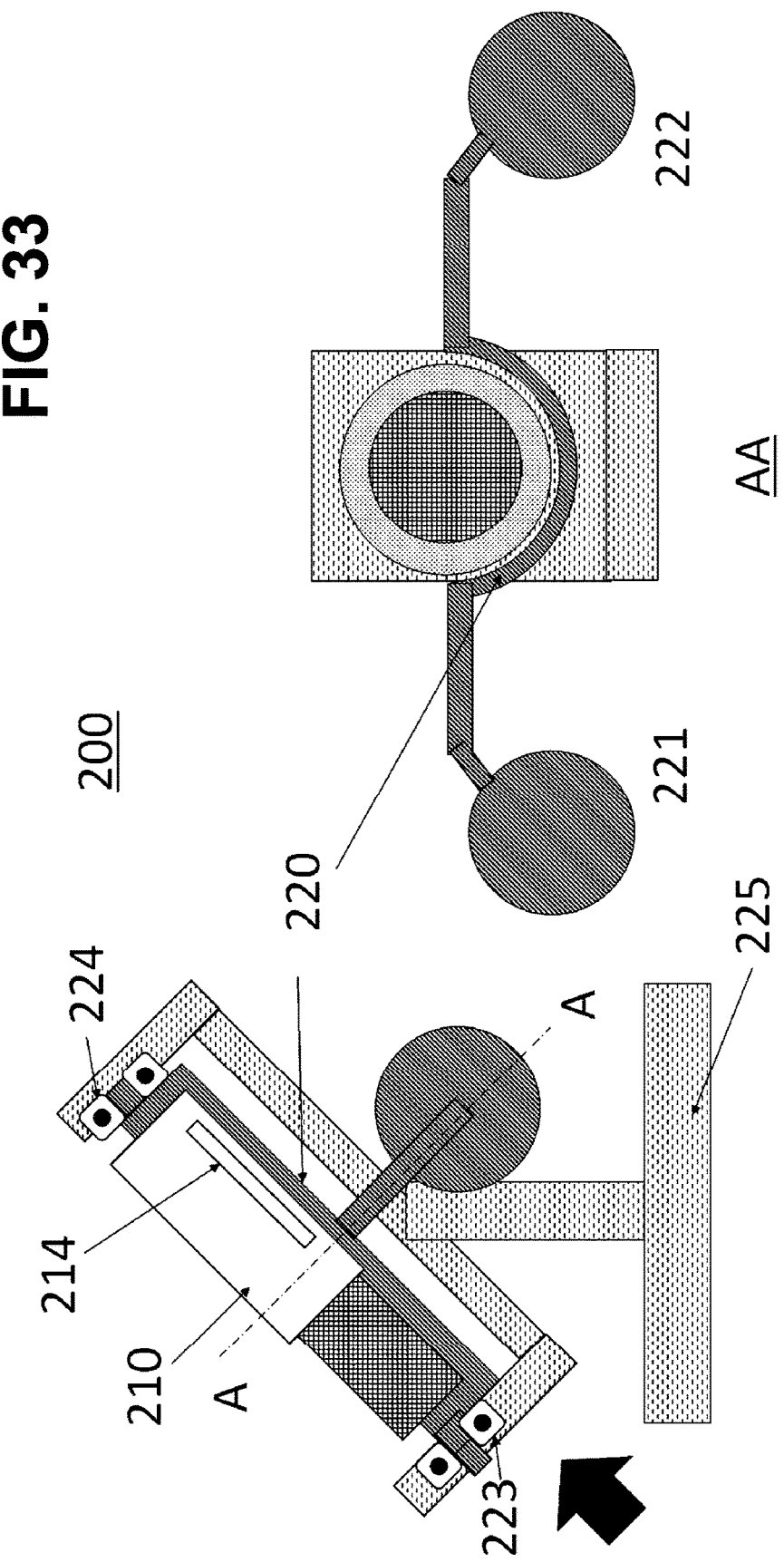
FIG. 33 is a schematic diagram illustrating an exemplary hologram illumination device of the thirteenth embodiment.

It is not necessary to drive the rocking by electrical means, but spiral and helical springs with elastic force can also be used as the driving force. Further, gravitational force alone may be utilized to cause rocking in the manner of a swaying balancing toy. A thirteenth embodiment will be explained using FIG. 33. The hologram illumination device 200 comprises a penlight module 210 including a hologram 214 and a penlight holder 220 with a rocking mechanism on which to place it. The penlight holder 220 is connected to the holder 225 by bearings 223, 224 and, in addition to their being able to rotate, weights 221, 223 are placed to be in positions so that their center of gravity is slightly below the center of the rotating shaft with respect to gravity. By means of this mechanism, the penlight undergoes a rocking motion at a slow speed when inserted into the holder. In an embodiment with a structure in which the penlight module and the holding stand can be separated, the switch may also be made to be activated to turn on the light for a specified time or to start rocking for a specified length of time when the penlight module is set down on the holding stand. Further, a device for rocking by gravity may also be made to start the rocking motion by having the initial motion imparted by a human hand, to be lighted until it becomes still and to be turned off by itself when the rocking stops. This control is executed by installing an optoelectronic sensing device to sense whether or not the optoelectronic sensing device is blocked by the rocking action. In addition, a storage battery is incorporated in the penlight module, and the storage battery may also be made to be charged when the module is set down on the holding stand.

Figure 34:
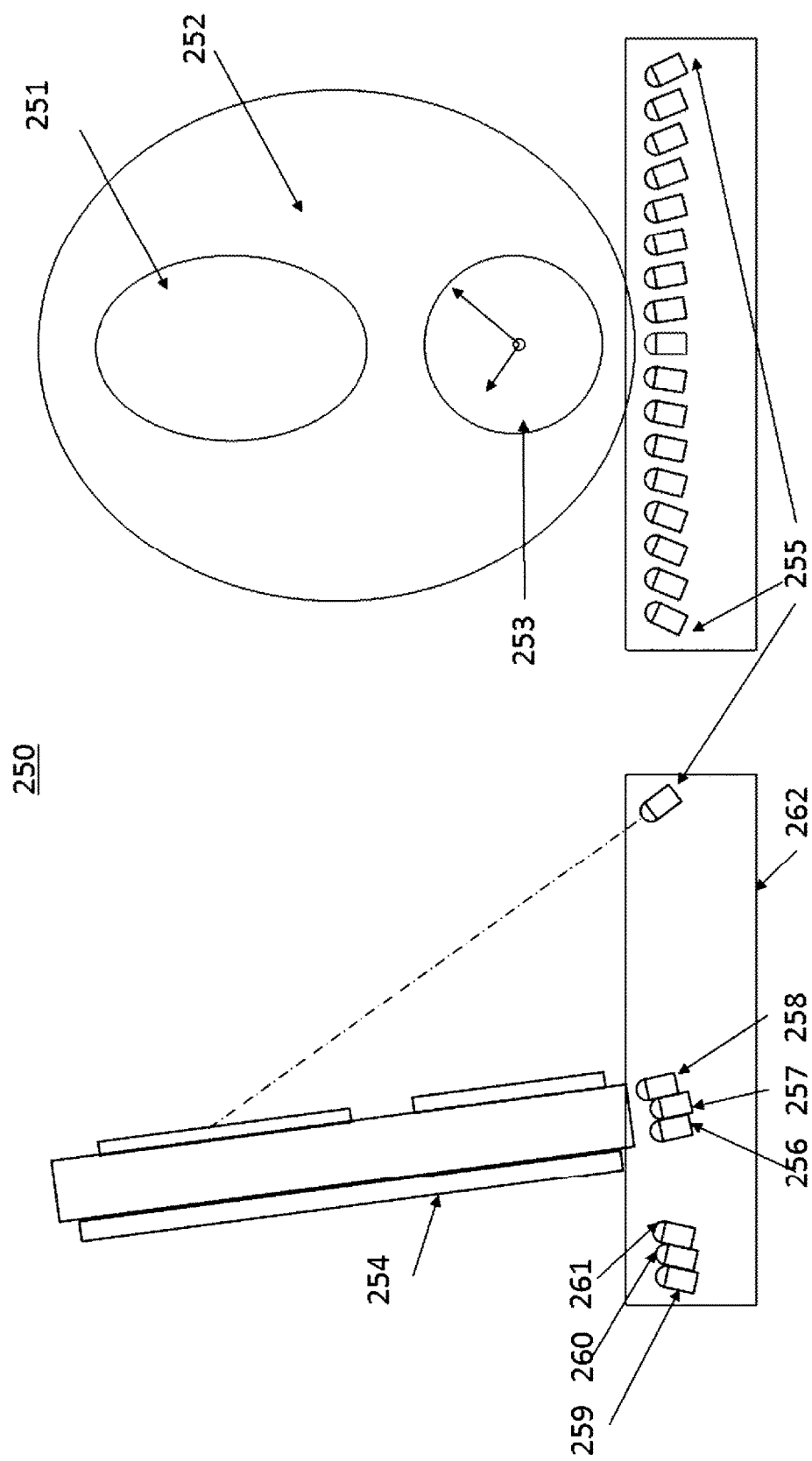
FIG. 34 is a schematic diagram illustrating the fourteenth embodiment in the configuration for viewing a hologram.

A fourteenth embodiment will be explained using the hologram illumination device 250 in FIG. 34. A hologram 251 is attached with an adhesive agent on the surface of a glass plate 252 with a thickness of on the order of 10 mm-100 mm. The glass plate 252 is mounted on a casing 262, and the hologram is made to face in an upward direction in the range from 0 degree to 45 degrees so that the hologram is easily viewed from directly in front when the casing is placed on a surface such as that of a desktop. It is desirable if this angle is made adjustable. Light from LEDs 255 mounted inside the same casing is incident on the hologram from various angles. Light from a plurality of LEDs may be made to be incident, or also a single LED may be made to undergo swaying motion by utilizing forces such as electromagnetic force, gravitational force or elastic force. On the other hand, light from red, green and blue LEDs 256, 257, 258 are made to be incident into the interior of the glass from the end of the glass plate 252. The decorative effect of the LEDs 256, 257, 258 are enhanced by using a glass plate with an outer shape that is cut and polished at various angles, referred to as a diamond cut, or with 3D laser engraving applied internally.

The hologram may be attached to the glass plate on the side of the viewer, or it may be attached on the side opposite the viewer and further, it may be disposed so that it is sandwiched among a plurality of glass plates. Different light sources are placed in different positions, and it is also possible to provide different sequences of decorative as well as dramatic presentation effects such as by turning them on sequentially, illuminating, for example, the optical diffuser in the background with an underlying blue tone when the first hologram is illuminated and illuminating the optical diffuser in the background with an underlying red tone when the second hologram is illuminated. In the case that the hologram is attached to the glass plate on the side opposite the viewer, an acrylic member 254 that is formed like ground glass is placed further behind it. The surface of this acrylic member is decorated by laser processing and the part that is processed is highlighted when illuminated by light. The acrylic member 254 is illuminated by light from the red, green and blue LEDs mounted inside the casing 262. In this way, it is possible to enhance the decorativeness of the hologram by illuminating with light from inside or outside the base material on which the hologram is attached.

A clock 253 is embedded in a part of the glass plate 252. Items may also be installed, not limited to an analog clock as shown in the figure, such as a clock with digital display, a thermometer, a hygrometer, a calendar, a photo display, an LCD or several of these in combination.

The glass plate 252 may also be made of, not glass, but a material such as those described above that contain plastic material such as acrylic, polycarbonate or polystyrene resin, or a phosphor material.

As it has been explained in all the embodiments described in the foregoing, from the first to the fourteenth, the light source to be incident to the optical diffuser and the light source for illuminating the hologram may either be the same, or be separate. Even in the case that they are separate, upon using the power supply section, such as the battery, in common, the balance between the amounts of power supplied to the light sources is made to be different when illuminating or not illuminating the hologram, in order to save power consumption.

Since the prominence of the hologram image is lost if the light illuminating the optical diffuser is too intense, linked operation is executed such as to reduce the light illuminating the optical diffuser only when viewing the hologram. That is, dramatic presentation effects of lighting that changes with time may also be provided, such as to first make, upon turning on the switch, the optical diffuser be lighted with various colors and brightness by sequential intense illumination by each of the red, green and blue LEDs with different timing, then to make a plurality of LEDs for illuminating the hologram be sequentially lighted, then to make the red, blue and green LEDs for illuminating the optical diffuser become slightly brighter at the same time as slowly darkening the LEDs for illuminating the hologram, and then turning off all of the LEDs.

In the embodiments described above, examples were cited of cases in which the predetermined angle of the device was 45 degrees to match the optimal angle of illumination of the hologram. That is, in the condition of illuminating the hologram support unit described above, the angle between the line joining the light source described above and the center of the hologram or holographic stereogram described above and the normal to the surface of the hologram or holographic stereogram described above is set to be 45 degrees upward, or 45 degrees downward with respect to the viewer, but it is not limited to these values. Preferably, the support should be with the angle described above maintained to be a predetermined angle between 40 degrees and 70 degrees upward or between 40 degrees and 70 degrees downward. An angle that is less than 40 degrees is undesirable because the light from the light source would be more likely to enter the eyes of the viewer, An angle that is greater than 70 degrees is undesirable because, whereas the illumination device is made to be compact, viewing of a bright hologram image would be made more difficult due to the greater surface reflection at the hologram surface.

In the embodiments described above, components such as an opaque member, an absorbing member, a diffusing member, or combinations thereof, that are not shown in the figure are placed in the vicinity of the light source on the side of the viewer because the light from the light source, if it reaches the eyes of the viewer without being blocked, absorbed or diffused, results in glare that disturbs viewing.

Although the first to the twelfth embodiments to which the invention is applied have been described in detail above, the present invention is not limited to the embodiments described above and various modifications can be made based on the technical concepts of the present invention.

For example, in a third variation, the basic constitution is the same as in the third embodiment, and the light-guiding diffuser may also be made in the form of a round fan with a radiating skeletal structure.

Or, it is also possible to make, for example, the battery for the light source replaceable, or the light source replaceable by adopting a socket-type arrangement.

Further, in the cases of a display of merchandise or of use as POP (point of purchase advertising) in the shop, power may also be supplied from an outlet, mediated by an AC adaptor voltage converter, since a battery requires replacement during an extended period of display.

Further, a solar cell may be incorporated to dispense with the use of dry-cell or button-cell batteries.

LEDs are cited as an example of the light source, but self-luminous devices such as lamps including krypton, xenon and halogen lamps, lasers, fluorescent lamps and organic LED devices may also be used. Although examples incorporating, as LEDs, one each of three types of LEDs, red, green and blue, are described in the first to the third embodiments, a single white LED may also be used.

Although such materials as glass and cast acrylic material with good laser processability are suitable for use as the base material for an optical diffuser, materials not limited to these, such as polymer resin materials including polycarbonates and polystyrenes may also be used. Further, it is possible to provide visual effects of colors that are not necessarily the same as those of the wavelengths of emission of the LEDs if it is made, even just partially, with materials such as a variety of phosphors or materials that are luminous under black light, In addition, the member to be placed in the hologram support unit is not limited to the card type, but any member incorporating a hologram and held in a condition that allows viewing may be applied, such as a key holder or a sticker.

Furthermore, although, in the embodiments described above, explanations are given of cases in which a member such as a holographic card can be freely removed, if intended by the viewer, from the hologram support unit, and in which it is attached by such means as an adhesive agent or a double-sided adhesive tape that is non-redetachable, it may also be arranged that, at first, a single hologram is attached in a non-redetachable manner, next to which it is possible to mount another hologram on top by the intention of the viewer. It may be made possible to house a plurality of holograms inside the illumination device and to view each hologram medium by mounting it, in turn, on the hologram support unit by the intention of the viewer.

A device for playing sound may be incorporated in the present illuminating device. It is also possible to play such sounds as the voice of a person or the cry of an animal that is the subject of the hologram.

A microphone for sound collection may be incorporated in the present illuminating device. In particular, if sound can be collected in the configuration of the eighth embodiment, utilization as a microphone for such use as in karaoke is possible.

The present illumination device may have a communication link. External control of the status is also possible, such as control of the mode of lighting, as well as turning on, flashing, and turning off the light. It is also possible to control a plurality of illuminating devices at the same time. It is also possible to control the light in accordance with various dramatic presentations such as music and environmental sound.

In the present illumination device, it is also possible to incorporate such sensors as a human body sensor that utilizes such means as infrared rays, ultrasound or visible light to detect temperature changes caused by the movement of a body, with a temperature difference from the surroundings, in the vicinity of the illumination device, to turn on the light source for viewing the hologram or to perform a rocking motion only when a viewer is present, and to turn off the light as well as stop the motion in the absence of a viewer. The present illumination device may have an accessory component with a hook shape, or it may be processed to have a through hole, for ease of hanging. This enables its use as an ornament for such decorations as a Christmas tree or by attaching a key holder or a strap.

What is claimed is:

1. An illuminating device,
comprising:
   a hologram support unit coupled to an image-recorded hologram or a holographic stereogram;
   a light source; and
   an optical diffuser element having a section causing the light source to be optically diffused over a space at least outside the viewing zone of the hologram or the holographic stereogram,
wherein:
   the diffuser element is located in such a way that the hologram or the holographic stereogram is not illuminated by the diffused light; and
   the light source and the hologram or the holographic stereogram are configured so that the line joining the said light source and the center of the hologram or the holographic stereogram and the normal to the surface of the hologram or the holographic stereogram can be fixed at a predetermined angle;
further comprising:
   an anisotropic diffuser member or an anisotropic absorbing member disposed on the side opposite to the viewer in the zone of the hologram support unit where the hologram medium is placed.

2. An illuminating device according to claim 1,
wherein:
   the hologram or the holographic stereogram is reflective;
   the light source illuminates both the hologram or the holographic stereogram and the optical diffuser; and
   the diffused light from the optical diffuser does not illuminate the hologram or the holographic stereogram.

3. An illuminating device according to claim 2,
further comprising:
   an opaque member, an absorbing member, a diffusing member, or a combination thereof, wherein:
the light source is configured by placing the opaque member, the absorbing member, the diffusing member, or the combination thereof in the vicinity of the light source on the side of the viewer so that a light from the light source does not emit to outside the illuminating device.

4. An illuminating device according to claim 3, wherein:
the holographic medium is placed inside a transparent hollow structure;
an optically-clear window area, through which the holographic image is observed, is formed on the transparent hollow structure;
there is no light-diffusing element in the window area; and
at least a part of the transparent hollow structure is light-diffused.

5. An illuminating device according to claim 4, wherein:
a total light transmittance of the window area of the transparent hollow structure is greater than or equal to 80 percent.

6. An illuminating device according to claim 4, wherein:
a haze value of the window area of the transparent hollow structure is less than or equal to ten (10) percent.

7. An illuminating device according to claim 4, wherein:
the diffusing or opaque parts is kept to be less than or equal to ten percent in the window area of the transparent hollow structure.

8. An illuminating device according to claim 4, wherein:
the surface of the hollow structure is treated with anti-reflective coating.

9. An illuminating device according to claim 4, wherein:
the surface of the hollow structure is treated with fabrication of a moth-eye structure.

10. An illuminating device according to claim 4, wherein:
the housing is composed of a curved surface with curvature.

11. An illuminating device according to claim 2, wherein:
the illumination light is incident from a front surface of the hologram or the holographic stereogram to the viewer.

12. An illuminating device according to claim 3, wherein:
a diffuser sheet is placed inside a hollow structure.

13. An illuminating device according to claim 3, wherein:
the holographic medium is placed inside a transparent hollow structure;
physically opened window area, through which the holographic image is observed, is formed on the transparent hollow structure; and
at least a part of the transparent hollow structure is light-diffused.

14. An illuminating device according to claim 1, wherein:
a first configuration and a second configuration can be switched, the first configuration being the configuration where the light source mainly illuminates the optical diffuser and the second configuration being the configuration where the light source mainly illuminates an image area of the hologram or the holographic stereogram at the predetermined angle.

15. An illuminating device according to claim 1, wherein:
the hologram support unit is a plate-shaped element comprising an optical diffuser,
the light source and the optical diffuser are coupled by a movable element, and
a first configuration and a second configuration can be switched, the first configuration being the configuration where light is incident on the plate-shaped element, the second configuration being the configuration where the light source illuminates the hologram holding unit from the predetermined angle.

16. An illuminating device according to claim 1, wherein:
the predetermined angle being between 40 degrees and 70 degrees upward or between 40 degrees and 70 degrees downward with respect to the viewer.

17. An illuminating device according to claim 1, further comprising:
more than one light sources;
wherein:
each of the light sources sequentially illuminates the hologram support unit from different angles.

18. An illuminating device according to claim 17, further comprising:
more than one light sources;
wherein:
an intensity of each of the light sources is controlled with gradation, and
each of the light sources is turned on sequentially as intensity of neighboring light sources lower.

19. An illuminating device according to claim 17, wherein:
more than one types of methods of controlling the light source, of which one type turns on a single light source for a defined time at a defined intensity.

20. An illuminating device according to claim 1, further comprising:
a deflector deflecting a light from the light source by transmitting or reflecting; and
a substantially cylindrical handle module,
wherein:
the light source is installed inside the substantially cylindrical handle module at approximately the center of a cylindrical axis so as to illuminate the hologram support unit in the direction along the cylindrical axis by use of at least one of the deflectors.

21. An illuminating device according to claim 1, wherein:
the optical diffuser element is any among particles in a liquid, a gaseous matter or a mixture of liquids of different kinds.

22. An illuminating device according to claim 1, further comprising:
a light source for light-guiding diffuser,
wherein:
a color of the light source for the hologram holding unit is white.

23. An illuminating device according to claim 1, wherein:
such forces as gravity, static electricity, magnetism or elasticity generates a rocking motion, showing different holographic parallax images to an unmoving viewer even when the illuminating device is held still.

24. An illuminating device according to claim 1, wherein:
   the holographic medium is attached on substantially transparent substrate;
   the optical diffuser element is formed on the substantially transparent substrate; and
   a light incomes from an edge of the substrate.

25. An illuminating device according to claim 24, wherein:
   the diffusing element is formed by the surface roughness modulation on the transparent substrate.

26. An illuminating device according to claim 1, further comprising:
   an external communication link,
   wherein:
   the light source is controlled via the external communication link from outside the illuminating device.

27. An illuminating device according to claim 1, further comprising:
   a human body sensor controlling the light source with interactions of a viewer.

28. An illuminating device according to claim 1, further comprising:
   an element having an asymmetrically-shaped socket to engage a hologram reproduction medium.

29. An illuminating device according to claim 1, wherein:
   the anisotropic absorbing member is louver film.

30. An illuminating device according to claim 1, wherein:
   the anisotropic diffusing member makes perpendicular incident light undiffused and makes slant incident light diffused.

31. An illuminating device according to claim 1, wherein:
   an illumination light beam is split into two beams, for illuminating the hologram and for illuminating the light-diffusing element.

\* \* \* \* \*